(12) United States Patent
Zhu et al.

(10) Patent No.: US 10,157,480 B2
(45) Date of Patent: Dec. 18, 2018

(54) EFFICIENT DECODING AND RENDERING OF INTER-CODED BLOCKS IN A GRAPHICS PIPELINE

(71) Applicant: Microsoft Technology Licensing, LLC, Redmond, WA (US)

(72) Inventors: Lihua Zhu, Mountain View, CA (US); B. Anil Kumar, Saratoga, CA (US); Guosheng Sun, Shanghai (CN); Olof L. E. Mases, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 15/192,827

(22) Filed: Jun. 24, 2016

(65) Prior Publication Data

US 2017/0372494 A1 Dec. 28, 2017

(51) Int. Cl.
*G06T 9/00* (2006.01)
*H04N 19/433* (2014.01)
(Continued)

(52) U.S. Cl.
CPC ............... *G06T 9/00* (2013.01); *G06T 15/04* (2013.01); *G06T 15/80* (2013.01); *H04N 19/433* (2014.11);
(Continued)

(58) Field of Classification Search
CPC ........... G06T 9/00; G06T 15/04; G06T 15/80; H04N 19/433; H04N 19/436; H04N 19/439; H04N 19/521; H04N 19/587
See application file for complete search history.

(56) References Cited

U.S. PATENT DOCUMENTS

| 5,778,098 A | 7/1998 | Lee et al. |
| 7,362,804 B2 | 4/2008 | Novotny et al. |

(Continued)

FOREIGN PATENT DOCUMENTS

| CN | 101123723 | 2/2008 |
| CN | 102254297 | 11/2013 |

(Continued)

OTHER PUBLICATIONS

Cheung et al., "Highly Parallel Rate-Distortion Optimized Intra-Mode Decision on Multicore Graphics Processors," *IEEE Trans. on Circuits and Systems for Video Technology*, vol. 19, No. 11, pp. 1692-1703 (Nov. 2009).

(Continued)

*Primary Examiner* — Hung Q Dang
*Assistant Examiner* — Sunghyoun Park
(74) *Attorney, Agent, or Firm* — Klarquist Sparkman, LLP

(57) ABSTRACT

Innovations in video decoding and rendering operations for inter-coded blocks in a graphics pipeline, in which at least some of the operations are performed using a graphics processing unit ("GPU"), are described. For example, a video playback tool receives encoded data for a current picture and performs operations to decode the encoded data and reconstruct the current picture. For a given inter-coded block of the current picture, a graphics primitive represents texture values as a point for processing by the GPU. The graphics primitive can have one or more attributes, including a motion vector, a block size, a display index value (indicating a location in a display buffer), and/or a residual index value (indicating a location of residual values). The operations performed by the video playback tool can include interpolation of sample values at fractional-sample offsets (Continued)

and motion compensation performed for inter-coded blocks in multiple passes for different block sizes.

20 Claims, 24 Drawing Sheets

(51) Int. Cl.
| | |
|---|---|
| *H04N 19/587* | (2014.01) |
| *H04N 19/513* | (2014.01) |
| *H04N 19/436* | (2014.01) |
| *H04N 19/42* | (2014.01) |
| *G06T 15/80* | (2011.01) |
| *G06T 15/04* | (2011.01) |

(52) U.S. Cl.
CPC ......... *H04N 19/436* (2014.11); *H04N 19/439* (2014.11); *H04N 19/521* (2014.11); *H04N 19/587* (2014.11)

(56) References Cited

U.S. PATENT DOCUMENTS

| | | | |
|---|---|---|---|
| 7,565,021 | B2 | 7/2009 | Feng et al. |
| 7,646,815 | B2 | 1/2010 | Dattani et al. |
| 7,646,817 | B2 | 1/2010 | Shen et al. |
| 7,885,336 | B2 | 2/2011 | Wong et al. |
| 8,180,165 | B2 | 5/2012 | Lu et al. |
| 8,233,527 | B2 | 7/2012 | Schmit et al. |
| 8,363,730 | B2 | 1/2013 | Saxena et al. |
| 8,411,734 | B2 | 4/2013 | Zhao et al. |
| 8,457,434 | B2 | 6/2013 | Zhu et al. |
| 8,542,745 | B2 | 9/2013 | Zhang et al. |
| 8,681,162 | B2 | 3/2014 | Paltashev et al. |
| 8,732,474 | B1 | 5/2014 | Perry et al. |
| 8,773,443 | B2 | 7/2014 | Diard |
| 8,804,831 | B2 | 8/2014 | Karczewicz et al. |
| 8,817,179 | B2 | 8/2014 | Zhu et al. |
| 8,929,459 | B2 | 1/2015 | Massimino |
| 9,300,976 | B2 | 3/2016 | Fuldseth |
| 2004/0076333 | A1 | 4/2004 | Zhang et al. |
| 2004/0190617 | A1 | 9/2004 | Shen et al. |
| 2007/0018979 | A1 | 1/2007 | Budagavi |
| 2007/0291858 | A1 | 12/2007 | Hussain et al. |
| 2008/0084932 | A1* | 4/2008 | Wang ................ H04N 19/176 375/240.24 |
| 2008/0273028 | A1 | 11/2008 | Jiao et al. |
| 2008/0310509 | A1 | 12/2008 | Goel |
| 2009/0002379 | A1 | 1/2009 | Baeza et al. |
| 2009/0160865 | A1* | 6/2009 | Grossman ............... H04N 9/87 345/502 |
| 2010/0135418 | A1 | 6/2010 | Zhang et al. |
| 2012/0092353 | A1 | 4/2012 | Paltashev et al. |
| 2012/0317236 | A1 | 12/2012 | Abdo et al. |
| 2013/0044260 | A1 | 2/2013 | Vestergaard et al. |
| 2013/0044805 | A1 | 2/2013 | Vestergaard et al. |
| 2013/0051478 | A1 | 2/2013 | Wu |
| 2013/0128966 | A1 | 5/2013 | Gao et al. |
| 2014/0105272 | A1 | 4/2014 | Bulusu et al. |
| 2014/0192893 | A1 | 7/2014 | Sullivan et al. |
| 2014/0254671 | A1 | 9/2014 | Misra et al. |
| 2014/0368516 | A1 | 12/2014 | Taggart et al. |
| 2015/0023409 | A1 | 1/2015 | Schierl et al. |
| 2015/0110172 | A1 | 4/2015 | Ye et al. |
| 2015/0208084 | A1 | 7/2015 | Zhu et al. |
| 2017/0132178 | A1 | 5/2017 | Ramachandran |
| 2017/0295379 | A1 | 10/2017 | Sun et al. |
| 2017/0300312 | A1 | 10/2017 | Aharon et al. |
| 2018/0063540 | A1 | 3/2018 | Zhu et al. |
| 2018/0091764 | A1 | 3/2018 | Aharon et al. |
| 2018/0103261 | A1 | 4/2018 | Sun et al. |
| 2018/0152699 | A1 | 5/2018 | Kumar et al. |

FOREIGN PATENT DOCUMENTS

| | | |
|---|---|---|
| EP | 2034439 | 3/2009 |
| WO | WO 2007/093629 | 8/2007 |

OTHER PUBLICATIONS

Kalva et al., "Parallel Programming for Multimedia Applications," *Multimedia Tools and Applications*, vol. 51, Issue 2, pp. 801-818 (Jan. 2011).
W3C, "Web Workers," Editor's Draft, 27, Sep. 2016, 37 pp., downloaded from the World Wide Web on Oct. 10, 2016.
Web Hypertext Application Technology Working Group, "HTML Living Standard—Last Updated Oct. 10, 2016," Chapter 10, 43 pp., downloaded from the World Wide Web on Oct. 10, 2016.
Wikipedia, "Web Worker," 4 pp., downloaded from the World Wide Web on Oct. 10, 2016.
Anonymous, "Point Sprites (Direct3D 9)," downloaded from the World Wide Web on Apr. 12, 2016, 3 pp.
Ebrahimi et al., "MPEG-4 Natural Video Coding—An overview," *Journal of Signal Processing: Image Communication*, vol. 15, No. 4-5, 33 pp. (Jan. 2000).
Han et al., "Efficient Video Decoding on GPUs by Point Based Rendering," *Proc. ACM SIGGRAPH/Eurographics Symp. on Graphics Hardware*, PowerPoint presentation, 30 pp. (Sep. 2006).
Han et al., "Efficient Video Decoding on GPUs by Point Based Rendering," *Proc. ACM SIGGRAPH/Eurographics Symp. on Graphics Hardware*, 8 pp. (2006).
Hermans, "H.264/MPEG4_Advanced Video Coding," Seminar Report, Matriculation No. 284141 RWTH, 23 pp. (Sep. 2012).
ITU-T Recommendation H.264, "Advanced video coding for generic audiovisual services," 680 pp. (Jan. 2012).
ITU-T Recommendation H.265, "High efficiency video coding," 317 pp. (Apr. 2013).
Kamp et al., "Multihypothesis Prediction using Decoder Side Motion Vector Derivation in Inter Frame Video Coding," *SPIE Visual Communications and Image Processing*, vol. 7257, 8 pp. (Jan. 2009).
Munshi, "OES_point_sprite," https://www.khronos.org/registry/gles/extensions/OES/OES_point_sprite.txt, 6 pp. (2004).
Munshi et al., "OpenGL® ES Common Profile Specification 2.0.24 (Difference Specification)," 81 pp. (2009).
Shen et al., "Accelerating Video Decoding Using GPU," *Int'l Conf. on Acoustics, Speech, and Signal Processing*, vol. 4, 4 pp. (Apr. 2003).
Sonnati, "H265—part I: Technical Overview," *Video Encoding & Streaming Technologies*, 7 pp. (Jun. 2014).
International Search Report and Written Opinion dated Oct. 25, 2017, from International Patent Application No. PCT/US2017/051967, 13 pp.
ISO/IEC, "Proposed Text for 14496-31 (VCB) CD," ISO/IEC JTC1/SC29/WG11 MPEG2014/M 33082, 95 pp. (Mar. 2014).
Office action dated Mar. 21, 2018, from U.S. Appl. No. 15/097,143, 14 pp.
Final Office Action dated Oct. 22, 2018, from U.S. Appl. No. 15/097,143, 13 pp.
Office Action dated Aug. 2, 2018, from U.S. Appl. No. 15/289,111, 9 pp.

\* cited by examiner software 180 implementing one or more innovations for efficient decoding and rendering of inter-coded blocks in a graphics pipeline

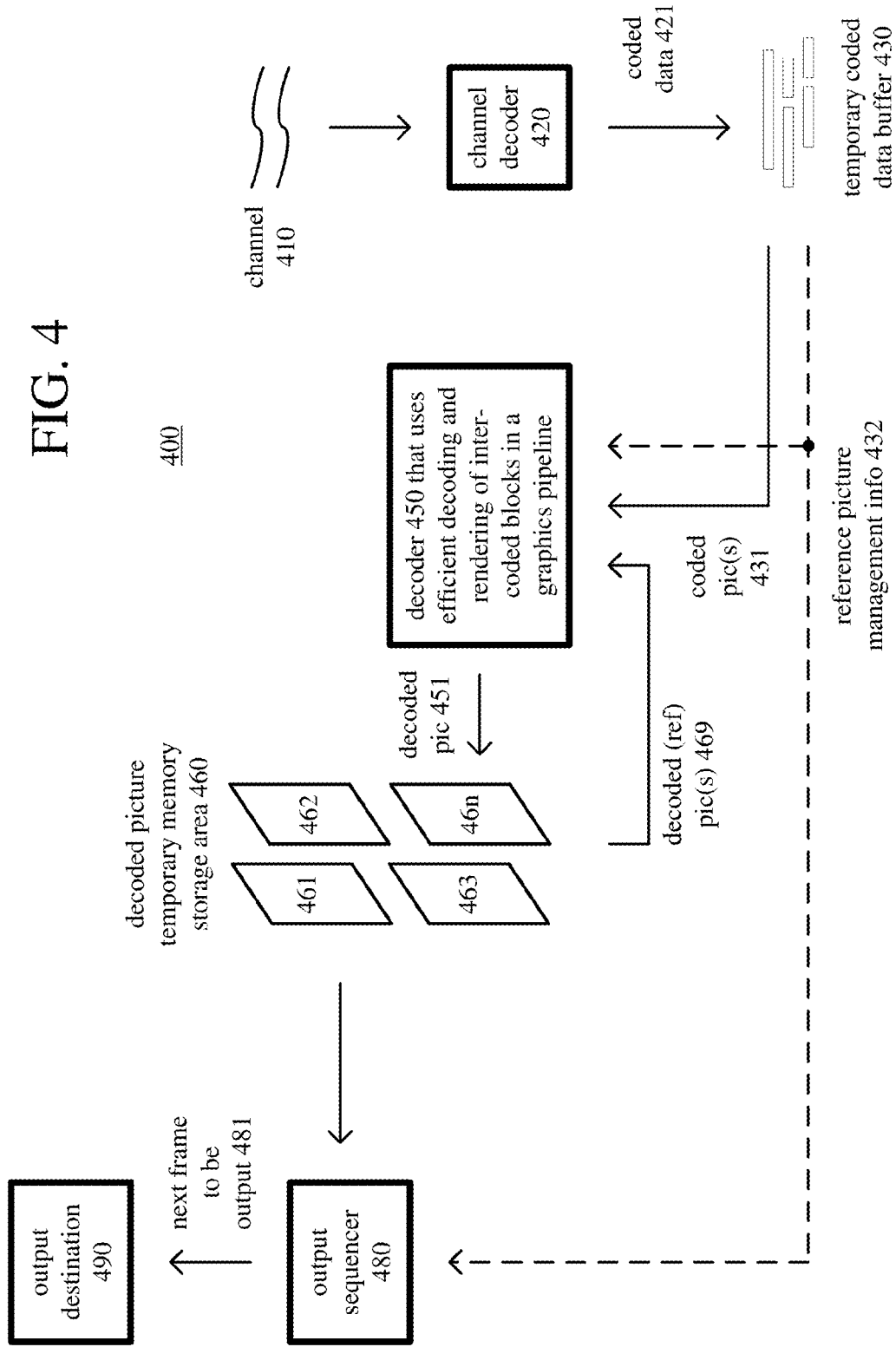

450

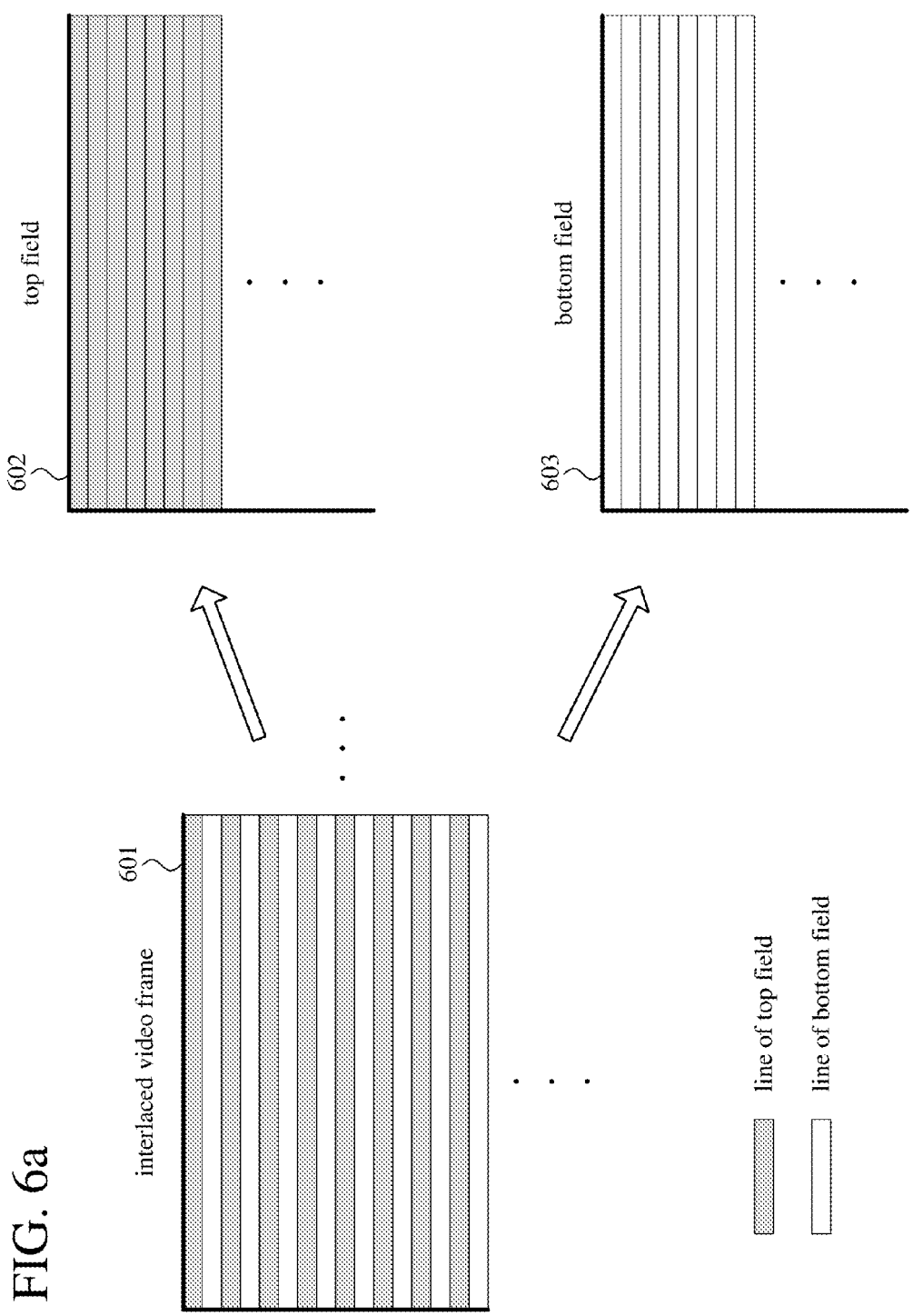

sample values (710) for luma (Y) component sample values (720) for first chroma (U) component sample values (730) for second chroma (V) component

FIG. 7
700 sample values (810) for luma (Y) and chroma (U, V) components

FIG. 8
800

FIG. 13 1300 graphics primitive (1110) for block Y1 as a point transform (resize)

transform (map predicted sample values)

transform (map residual values)

(0, 1) (1, 1)
(0, 0) (1, 0)

reference buffer (1050) in GPU memory enlarged view (1320) of predicted sample values for block Y1

+ enlarged view (1330) of residual values for block Y1

= enlarged view (1340) of sample values for block Y1 block Y1 transferred to display buffer (1090) in planar format texture buffer (1040) in GPU memory

| 0 | 1 | 2 | 3 | 4 | 5 | 6 | 7 |
| 8 | 9 | | | | | | |

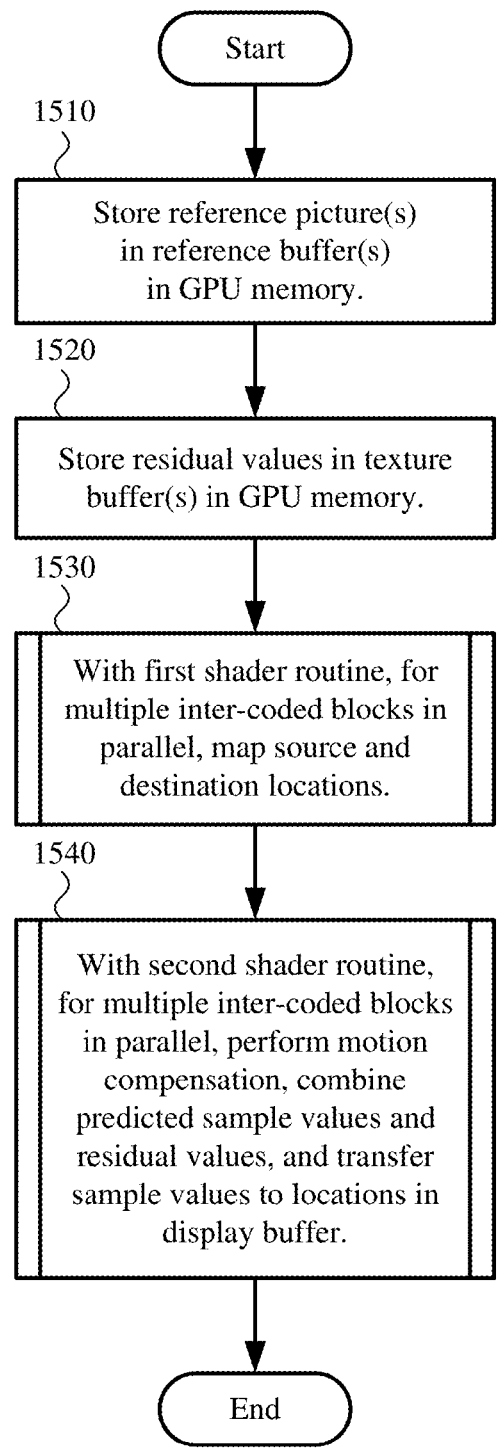
FIG. 15a    1500    (example of stage 1220)

FIG. 15b 1531 (example of stage 1530)
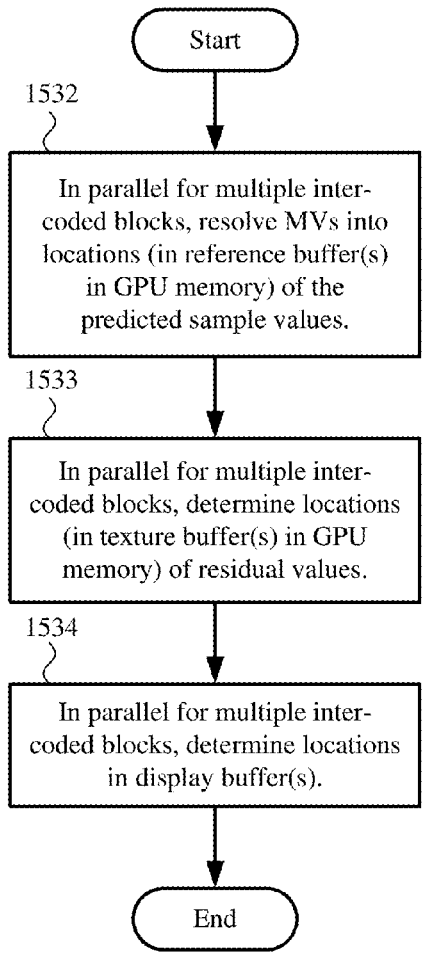
FIG. 15c 1541 (example of stage 1540)
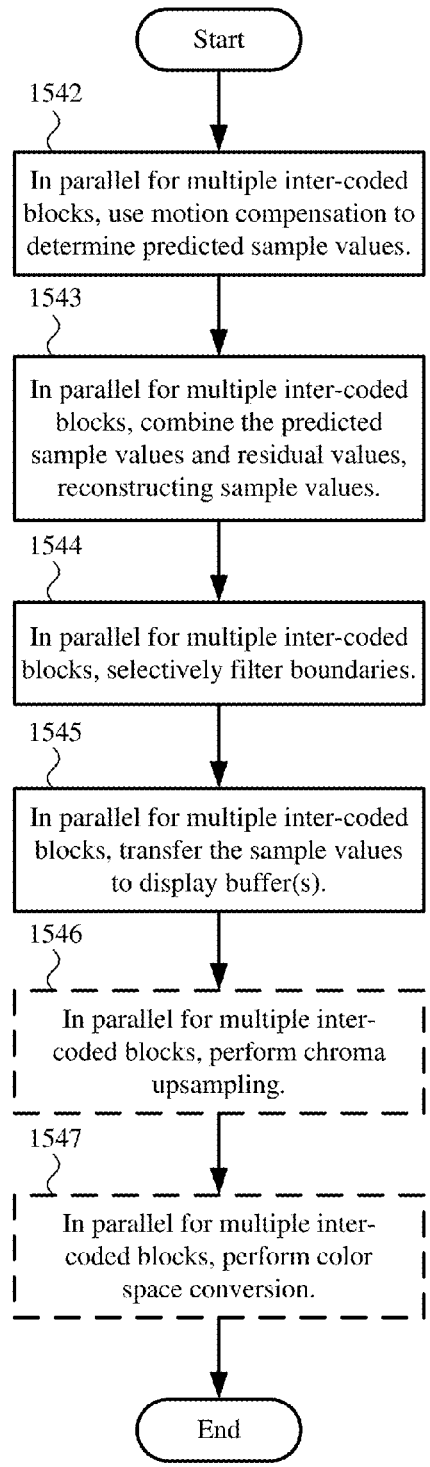

FIG. 16

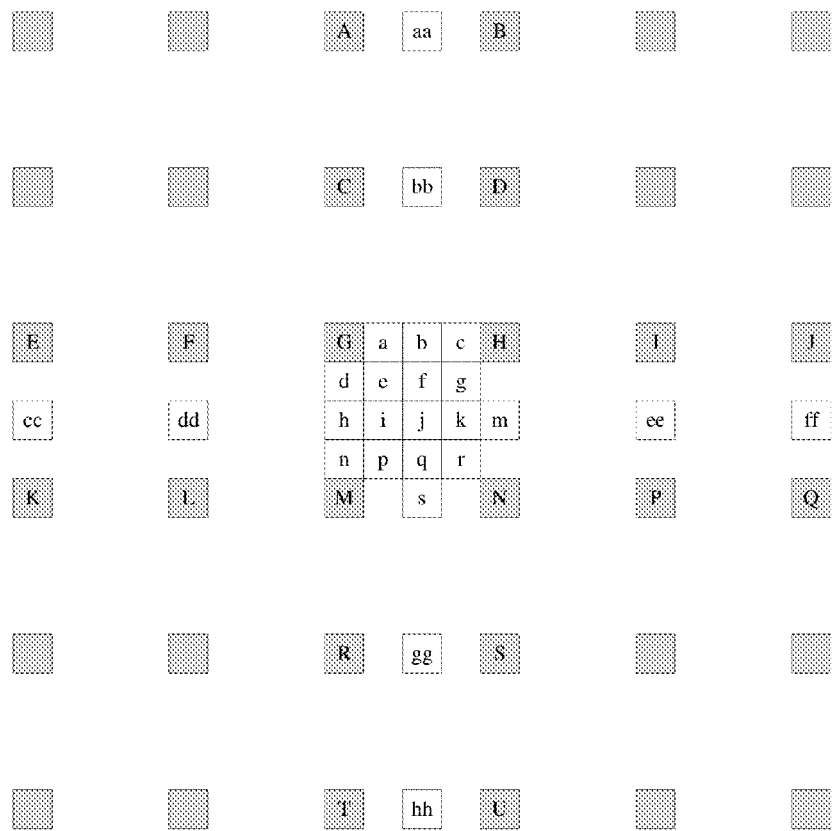

 sample value at integer-sample offset

 sample value at fractional-sample offset h = ((A − 5C + 20G + 20M − 5R + T) + 16) >> 5 (same pattern for cc, dd, m, ee, and ff at ½-sample offset horizontally)

b = ((E − 5F + 20G + 20H − 5I + J) + 16) >> 5 (same pattern for aa, bb, s, gg, and hh at ½-sample offset vertically, and for j at ½-sample offsets horizontally and vertically)

a = (G + b + 1) >> 1 (same pattern for c, d, f, i, k, n, and q at ¼-sample offset horizontally or vertically)

e = (b + h + 1) >> 1 (same pattern for g, p, and r at ¼-sample offsets horizontally and vertically, using sample values at ½-sample offsets)

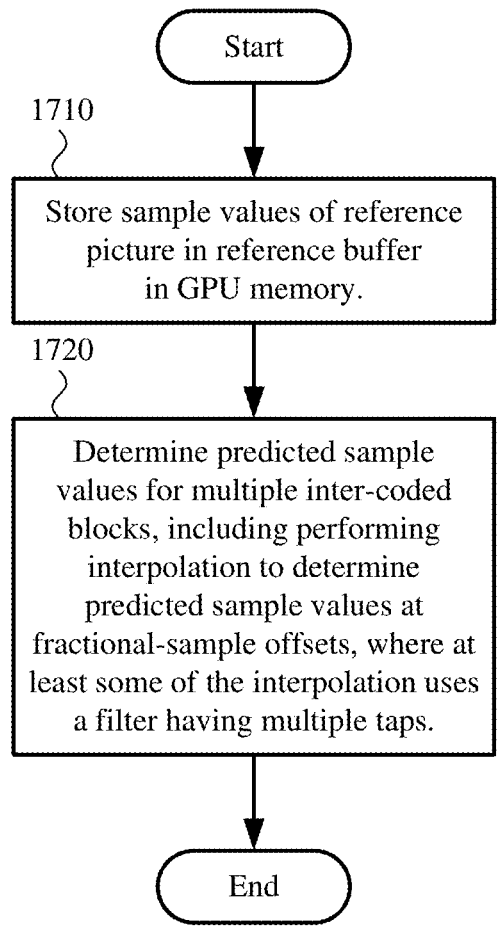
FIG. 17    1700    (example of stage 1220)

FIG. 18        1800 for current picture:
reference buffer (1810) that stores sample values at integer-sample offsets (*e.g.*, A...U in FIG. 16)

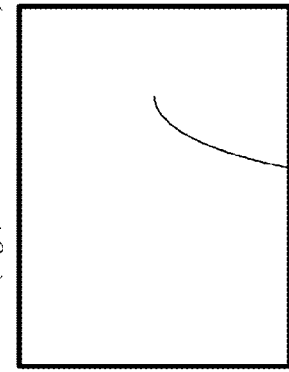

for current picture:
with 6-tap filter, interpolate sample values at ½-sample offsets horizontally (*e.g.*, aa, bb, h, s, gg, and hh in FIG. 16), which are stored in reference buffer (1820)

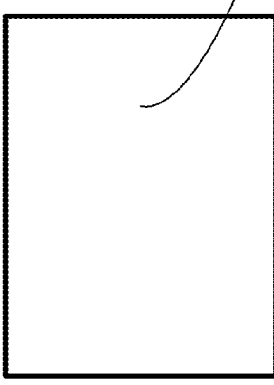

for current picture:
with 6-tap filter, interpolate sample values at ½-sample offsets vertically (*e.g.*, cc, dd, h, m, ee, and ff in FIG. 16), which are stored in reference buffer (1830)

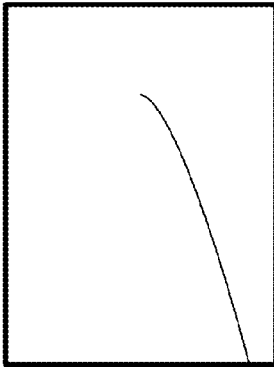

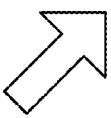
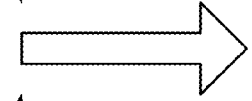

on demand for inter-coded blocks:
with bilinear filter, interpolate sample values at ¼-sample offsets (*e.g.*, a, c, d, e, f, g, i, k, n, p, q, and r in FIG. 16) using selected sample values at integer-sample offsets, ½-sample offsets horizontally, and/or ½-sample offsets vertically

OR with 6-tap filter, interpolate sample values at ½-sample offsets horizontally and vertically (*e.g.*, j in FIG. 16) using selected sample values at ½-sample offsets vertically

FIG. 20a

FIG. 21
(example of stage 1220)
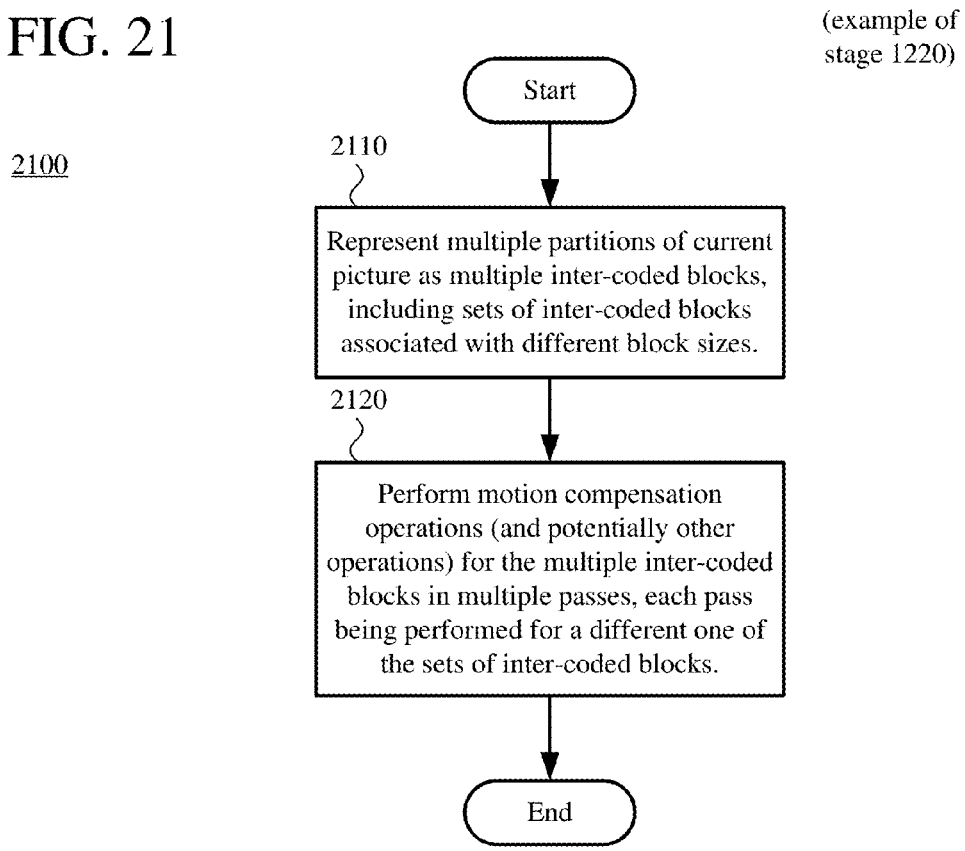
FIG. 22  2200
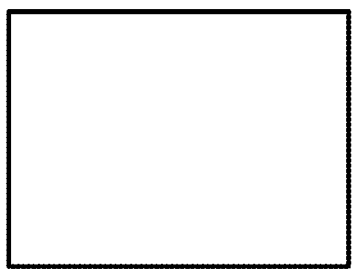
reference buffer (2210) that stores sample values for interlaced video frame
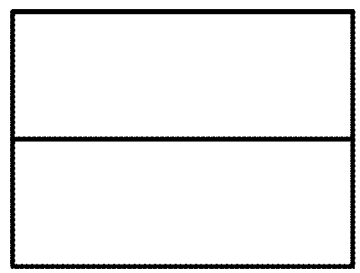
reference buffer (2220) that stores sample values for top field of interlaced video frame
reference buffer (2230) that stores sample values for bottom field of interlaced video frame

EFFICIENT DECODING AND RENDERING OF INTER-CODED BLOCKS IN A GRAPHICS PIPELINE

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. The number of bits that is used per second of represented video content is known as the bit rate. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10), and H.265 (ISO/IEC 23008-2) standards, the MPEG-1 (ISO/IEC 11172-2) and MPEG-4 Visual (ISO/IEC 14496-2) standards, and the SMPTE 421M (VC-1) standard. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats define other options for the syntax of an encoded video bitstream and corresponding decoding operations.

Conventionally, a video playback tool includes a video decoder as well as functionality to render reconstructed video pictures for display. Video decoding and rendering operations can be computationally intensive. In particular, while some video decoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit-rate video (e.g., compressed high-definition video) or decoding of low-latency video (e.g., for remote desktop conferencing or real-time communication).

Thus, some video playback tools use hardware acceleration to offload certain computationally intensive operations to a graphics processor or other special-purpose hardware. For example, in some configurations, a computer system includes a primary central processing unit ("CPU") (or multiple primary CPUs) as well as a graphics processing unit ("GPU") or other hardware specially adapted for graphics processing or video decoding. A video playback tool uses the primary CPU as a host to control overall decoding and uses the GPU (or special-purpose decoding hardware) to perform operations that collectively require extensive computation, accomplishing video acceleration. In a typical software architecture for hardware-accelerated video decoding, a host controls overall decoding and may perform some operations such as bitstream parsing using the CPU(s). Across an acceleration interface, the decoder signals data to a device driver for an accelerator (e.g., with a GPU), which performs decoding operations.

A video playback tool often requests encoded video from a server over a network. For this reason, a video playback tool may be referred to as a "client." A video playback tool can be adapted to the computing platform on which the video playback tool runs ("native client"). For example, a native client can be specially adapted to run on a particular operating system ("OS") and/or hardware configuration, using libraries of the OS or using operations specific to a CPU. When the hardware configuration includes a GPU, the native client can use the GPU to perform certain decoding and rendering operations, which can further speed up the decoding and rendering process. On the other hand, the process of developing native clients for different OSs, platforms, etc. can be time-consuming, especially as the number of versions of OSs and hardware configurations increases, and the installation process for native clients can be complicated.

According to an alternative approach, a video playback tool manages video playback in conjunction with a Web browser. The browser-based video playback tool can include routines in a scripting language or other browser-executable programming language, which can be run in a Web browser environment on diverse computing platforms and OSs. The routines are specified in a platform-agnostic way, which simplifies the development process and installation process. On the other hand, previous browser-based video playback tools can be overwhelmed by the computational complexity of video decoding and rendering operations, especially for time-sensitive scenarios such as remote desktop presentation and real-time communication.

SUMMARY

In summary, the detailed description presents innovations in video decoding and rendering operations for blocks in a graphics pipeline, in which at least some of the operations are performed using a graphics processing unit ("GPU"). In particular, the innovations focus on decoding of blocks that have been encoded using inter-picture prediction (inter-coded blocks). The innovations can speed up the process of decoding and rendering video content, which is especially useful for scenarios such as remote desktop presentation or real-time conferencing.

According to various aspects of the innovations described herein, a video playback tool receives encoded data for a current picture. The video playback tool performs operations to decode the encoded data and reconstruct the current picture. For a given inter-coded block among multiple inter-coded blocks of the current picture, a graphics primitive (e.g., point sprite) represents texture values for the given inter-coded block as a point for processing by a GPU. The graphics primitive for the given inter-coded block can have one or more attributes. For example, the attributes include a motion vector attribute for the given inter-coded block, a block size attribute for the given inter-coded block, a display index value attribute (indicating the location of the given inter-coded block in a display buffer), and/or a residual index value attribute (indicating the location of residual values for the given inter-coded block in a texture buffer in GPU memory).

According to one aspect of the innovations described herein, the operations performed by the video playback tool include storing sample values of a reference picture in a reference buffer in GPU memory, which is memory accessible by the GPU. The operations also include determining predicted sample values for multiple inter-coded blocks. This includes performing interpolation to determine interpolated sample values at fractional-sample offsets. At least some of the interpolation uses a filter having multiple taps. In this way, the video playback tool can effectively interpolate sample values for motion compensation in a graphics pipeline.

When performing the interpolation, the video playback tool can preemptively perform some interpolation operations for at least part of the current picture, but perform other interpolation operations only as appropriate (on demand) for specific inter-coded blocks. In this way, the video playback tool can automatically interpolate sample values that are commonly used, but avoid interpolating other sample values, which simplifies overall decoding. For example, in a first reference buffer, the video playback tool stores sample values at integer-sample offsets for a reference picture. For at least part of the current picture, the video playback tool calculates (e.g., using the filter having multiple taps) first interpolated sample values at ½-sample offsets horizontally and stores the first interpolated sample values in a second reference buffer in GPU memory. The video playback tool also calculates (e.g., using the filter having multiple taps) second interpolated sample values at ½-sample offsets vertically and stores the second interpolated sample values in a third reference buffer in GPU memory. Then, for each of multiple inter-coded blocks, if appropriate (on demand), the video playback tool calculates (e.g., using bilinear filtering) third interpolated sample values at ¼-sample offsets. For this interpolation, the video playback tool uses selected sample values among the sample values at integer-sample offsets, the first interpolated sample values, and the second interpolated sample values. As needed, the video playback tool can also interpolate (e.g., using the filter having multiple taps) sample values at ½-sample offsets vertically and horizontally.

When multiple reference pictures are available for motion compensation, different reference buffers can store different reference pictures. A given block can be predicted from a single reference picture (e.g., so-called single predictive or unidirectional motion compensation), with different blocks in a picture potentially being predicted from different reference pictures. Or, a given block can be predicted from multiple reference pictures (e.g., so-called bi-predictive or bidirectional motion compensation). Pictures can be arranged according to hierarchical patterns of reference picture dependencies, for functionality such as temporally scalable coding/decoding and hierarchical bidirectional coding/decoding.

According to another aspect of the innovations described herein, the operations performed by the video playback tool include representing multiple partitions of the current picture as multiple inter-coded blocks, which include multiple sets of inter-coded blocks associated with different block sizes. For example, for each of the multiple partitions of the current picture, if the partition size of the partition is square, the video playback tool uses one of the multiple inter-coded blocks to represent the partition. Otherwise (the partition size is not square), the video playback tool uses two or more of the multiple inter-coded blocks to represent the partition. The video playback tool performs motion compensation for the multiple inter-coded blocks in multiple passes, where each of the multiple passes is performed for a different one of the sets of inter-coded blocks. In this way, the video playback tool can effectively perform motion compensation in a graphics pipeline for partitions having different sizes.

According to another aspect of the innovations described herein, the current picture is an interlaced video frame having a top field and a bottom field. The graphics primitive for a given inter-coded block has multiple attributes, including a flag indicating whether the given inter-coded block is field-coded or frame-coded and a flag indicating whether the given inter-coded block, if field-coded, is associated with the top field or the bottom field. The video playback tool can decode interlaced video content in a graphics pipeline using such flags.

In some example implementations, a video playback tool incorporating one or more of the innovations described herein is implemented, at least in part, using one or more shader routines executable with a GPU. The shader routine(s) can include a vertex shader routine and fragment shader routine. The vertex shader routine can be used to perform operations such as, in parallel for the multiple inter-coded blocks, respectively, (a) resolving motion vectors into locations, in a reference buffer in GPU memory (e.g., one of multiple available reference buffers for different reference pictures), of the predicted sample values; (b) determining locations, in a texture buffer in GPU memory, of residual values; and/or (c) determining locations in a display buffer. The fragment shader routine can be used to perform operations such as, in parallel for the multiple inter-coded blocks, respectively, (a) using motion compensation to determine predicted sample values; (b) combining the predicted sample values and corresponding residual values, thereby reconstructing sample values; (c) selectively filtering boundaries; (d) performing chroma upsampling; (e) performing color space conversion; and/or (f) transferring the sample values to a display buffer.

In some example implementations, a video playback tool incorporating one or more of the innovations described herein is implemented using one or more decoding routines executable in a browser environment running on a CPU as well as one or more shader routines executable with a GPU. Alternatively, a video playback tool incorporating one or more of the innovations described herein uses one or more native code routines executable with a CPU as well as one or more shader routines executable with a GPU.

The innovations can be implemented as part of a method, as part of a computing system configured to perform operations for the method, or as part of one or more computer-readable media storing computer-executable instructions for causing a computing system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 4 is a diagram of an example decoder system, and

FIGS. 6a and 6b are diagrams illustrating features of coding and decoding of interlaced video content.

FIG. 7 is a diagram illustrating sample values in a planar YUV format, and

FIG. 8 is a diagram illustrating sample values in a packed YUV format.

FIG. 13 is a diagram illustrating an example of decoding and rendering operations that use a graphics primitive.

FIGS. 15a-15c are flowcharts illustrating an example technique for performing decoding and rendering operations for inter-coded blocks with shader routines.

FIG. 16 is a diagram illustrating examples of interpolation operations during video decoding.

FIG. 17 is a flowchart illustrating an example technique for video decoding and rendering in a graphics pipeline, in which interpolation uses a filter having multiple taps.

FIG. 18 is a diagram illustrating an example of stages of interpolation when decoding inter-coded blocks in a graphics pipeline.

FIGS. 20a and 20b are diagrams illustrating examples motion-compensation partitions represented with blocks of different sizes for graphics primitives.

FIG. 21 is a flowchart illustrating an example technique for video decoding and rendering in a graphics pipeline, in which motion compensation is performed in multiple passes for blocks having different block sizes.

FIG. 22 is a diagram illustrating an example of buffering of reference pictures of interlaced video content.

DETAILED DESCRIPTION

Figure 1:
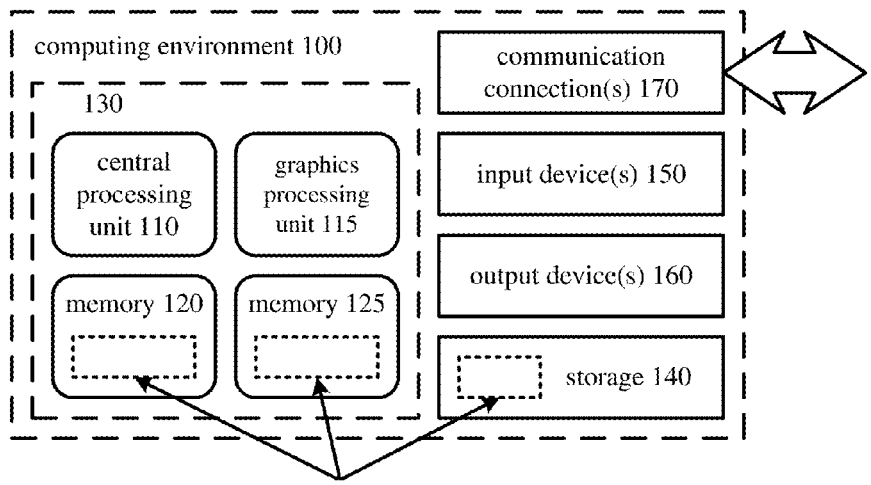
FIG. 1 is a diagram illustrating an example computing system in which some described embodiments can be implemented.

The detailed description presents innovations in video decoding and rendering operations for inter-coded blocks in a graphics pipeline, in which at least some of the operations are performed using a graphics processing unit ("GPU"). The innovations can speed up the process of decoding and rendering video content, which is especially useful for scenarios such as remote desktop presentation or real-time conferencing.

Some of the innovations described herein are illustrated with reference to terms specific to the H.264 standard or H.265 standard, or extensions or variations thereof. The innovations described herein can also be implemented for other video codec standards or formats (e.g., the VP8 format or VP9 format), or extensions or variations thereof.

According to some of the innovations described herein, certain operations of decoding and/or rendering are offloaded to a GPU. The GPU supports one or more interfaces through which shader routines can be specified. For example, the interfaces are WebGL, DirectX, or OpenGL interfaces. WebGL is a JavaScript application programming interface ("API") for rendering graphics within a compatible Web browser, without the use of plug-ins. Using WebGL, a browser can incorporate GPU-accelerated processing and effects as part of rendering a Web page. OpenGL is a cross-language, cross-platform API for rendering graphics, which may be used to interact with a GPU and thereby achieve hardware-accelerated rendering. DirectX is a collection of APIs for handling tasks related to multimedia processing on platforms from Microsoft Corporation. DirectX can be used to interact with a GPU to achieve hardware-accelerated rendering. Alternatively, the GPU exposes another interface.

In many examples described herein, a video playback tool performs at least some decoding and/or rendering operations in a browser environment running on a CPU, and offloads other decoding and/or rendering operations to a GPU. In some example implementations, the decoding and/or rendering operations performed in the browser environment can be performed without using any plugins or client-side decoding software outside the browser. For example, the decoding and/or rendering operations performed in the browser environment are part of a "clientless" gateway, which does not require any plugins or client-side decoding software outside the browser in order to support remote desktop presentation or virtual network computing functionality. Software routines for the decoding and/or rendering operations performed in the browser environment and software routines for the decoding and/or rendering operations offloaded to the GPU can be downloaded to the browser environment from a server, then executed locally. Alternatively, the video playback tool performs at least some decoding and/or rendering operations with native code running on a CPU, and offloads other decoding and/or rendering operations to a GPU. For example, a client executing native code decodes motion vectors ("MVs") and residual values for inter-coded blocks of a picture, then transfers the MVs and residual values to a GPU, which performs additional decoding operations and/or transfers sample values to a display buffer using shader routines as described herein.

Using innovations described herein, a video playback tool can reconstruct screen capture content with very low decoding latency. Performance improvements are especially noticeable for non-camera video content. Such video is common for remote desktop presentation scenarios. More generally, the innovations described herein can be used when decoding other types of video (e.g., "natural" video captured with a camera), especially when latency reduction is a goal (e.g., real-time communication scenarios).

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a GPU (115). In general, the GPU (115) is any specialized circuit, different from the CPU (110), that accelerates creation and/or manipulation of image data in a graphics pipeline. Typically, the GPU (115) has a highly parallel structure adapted for processing blocks of visual data in parallel, which tends to make the GPU (115) more effective than the general-purpose CPU (110) for 3D computer graphics, 2D computer graphics, and other image processing. The GPU (115) can be implemented as part of a dedicated graphics card (video card), as part of a motherboard, as part of a system on a chip ("SoC"), or in some other way (even on the same die as the CPU (110)). In some example implementations, in addition to supporting operations for texture mapping, rendering of polygons, and geometric calculations (such as rotation and translation of vertices between coordinate systems), the GPU (115) includes support for programmable shader routines. In general, a shader routine is any set of instructions executable by the GPU (115), which may be executed to manipulate vertices and textures with a wide range of operations. Many of the computations of the GPU (115) involve matrix and vector operations. In some example implementations, the GPU (115) provides specialized support for video decoding and playback operations such as interpolation of sample values at fractional-sample offsets, motion compensation, deblock filtering, blending and overlays, in addition to providing buffers for reconstructed video pictures.

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations for efficient decoding and rendering of inter-coded blocks in a graphics pipeline, which includes one or more GPUs, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations for efficient decoding and rendering of inter-coded blocks in a graphics pipeline.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine" and "receive" to describe computer operations in a computer system. These terms are high-level abstractions for operations performed by a computer, and should not be confused with acts performed by a human being. The actual computer operations corresponding to these terms vary depending on implementation.

II. Architecture for Hardware-Accelerated Decoding.

Figure 2:
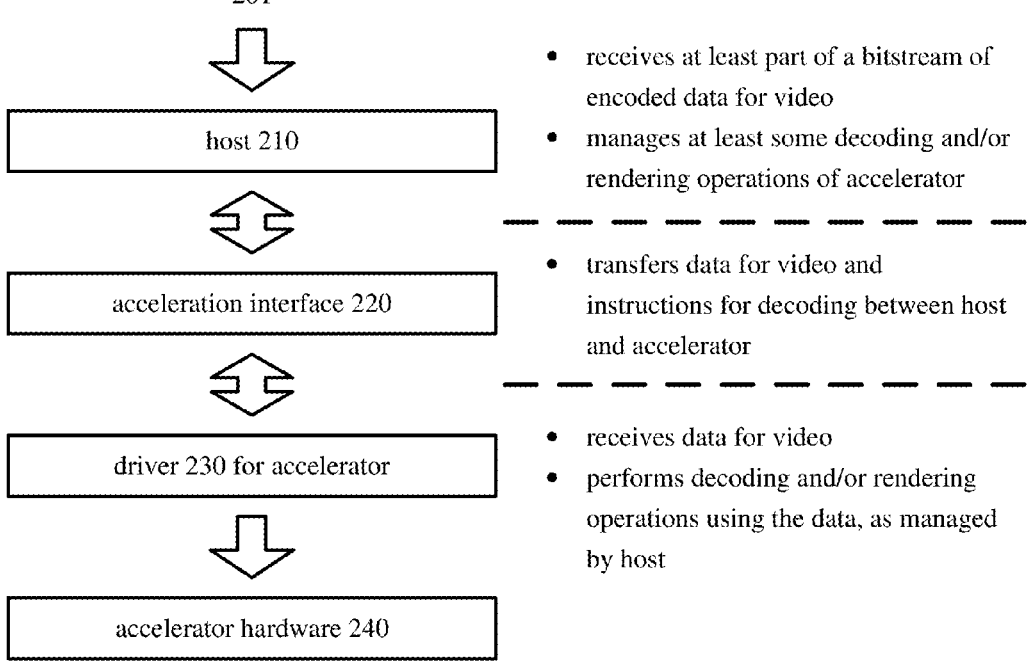
FIG. 2 is a diagram of an example architecture for hardware-accelerated decoding of video bitstreams.

FIG. 2 shows a simplified architecture (200) for hardware-accelerated decoding using a video playback tool. The architecture includes a host (210), an accelerator interface (220), a driver (230) for an accelerator, and accelerator hardware (240) for the accelerator. The driver (230) and accelerator hardware (240) collectively provide functionality for the accelerator. The accelerator hardware (240) can be, for example, one or more GPUs or special-purpose decoding hardware. In many of the examples described herein, the accelerator hardware (240) includes one or more GPUs.

The host (210) receives at least part of a bitstream (201) of encoded data for video and manages at least some video decoding operations and/or rendering operations of the accelerator. For example, the host (210) controls overall decoding and can also perform some decoding operations using a host CPU, e.g., entropy decoding operations, inverse quantization operations, inverse frequency transform operations. The host (210) signals control data and other data for a picture to the driver (230) for the accelerator hardware (240) across an acceleration interface (220). Typically, the host (210) is implemented as user-mode software. For example, the host (210) operates in a browser environment running on a CPU. Or, the host (210) executes native code running on a CPU.

To the host (210), the acceleration interface (220) provides a consistent interface to an accelerator, regardless of the provider of the accelerator. Conversely, to an accelerator, the acceleration interface (220) provides a consistent interface to a host, regardless of the provider of the host. In general, the acceleration interface (220) transfers data for video and instructions for decoding between the host (210) and the accelerator. The details of the acceleration interface (220) depend on implementation. For example, the acceleration interface (220) is exposed to the host (210) as an application programming interface ("API"). The acceleration interface (220) can be a WebGL API (operating in conjunction with a Web browser such as Microsoft Internet Explorer, Microsoft Edge, Google Chrome, Mozilla Firefox, Apple Safari, etc.), OpenGL API, DirectX, or other API(s).

In an example interaction, the host (210) fills a buffer with instructions and/or data then calls a method of the interface (220) to alert the driver (230). The buffer is part of CPU memory (memory that is accessible by a CPU). The buffered instructions and/or data are typically passed to the driver (230) by reference, and as appropriate transferred to memory of the accelerator hardware (240), e.g., to GPU memory (memory that is accessible by a GPU). While a particular implementation of the accelerator interface (220) and driver (230) may be tailored to a particular OS or platform, in general, the accelerator interface (220) and/or driver (230) can be implemented for multiple different OSs or platforms. The host (210) follows specified conventions when putting instructions and data in buffers in CPU memory. The driver (230) retrieves the buffered instructions and data according to the specified conventions and (with the accelerator hardware (240)) performs decoding and/or rendering operations.

The accelerator, through the driver (230) and accelerator hardware (240), receives data for video and performs video decoding operations and/or rendering operations using the data, as managed by the host (210). The division of decoding operations between the host (210) and the accelerator depends on implementation. For example, the host (210) performs basic bitstream parsing tasks, selectively enables/disables certain decoding operations (such as deblock filtering), manages buffering and updates of reference frames, and manages output of frames for display, and decoding functions such motion compensation, intra-picture prediction, loop filtering and post-processing are offloaded to the accelerator. Some decoding operations (such as inverse frequency transforms and inverse quantization/scaling) can be performed by the host (210) or accelerator, depending on the type of block being decoded or depending on implementation decisions. Alternatively, the host (210) performs certain additional decoding tasks instead of the accelerator, or the accelerator performs certain additional tasks otherwise performed by the host (210).

III. Example Network Environments.

Figure 3A:
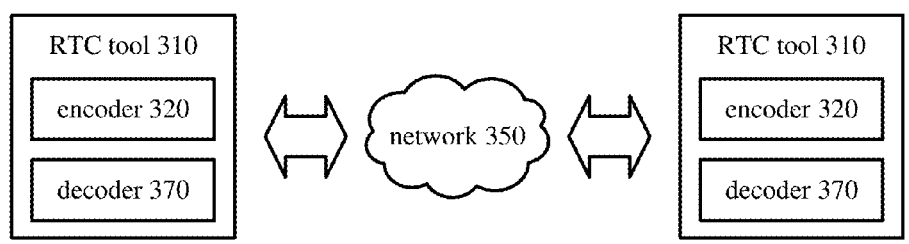
FIGS. 3a and 3b are diagrams illustrating example network environments in which some described embodiments can be implemented.
Figure 3B:
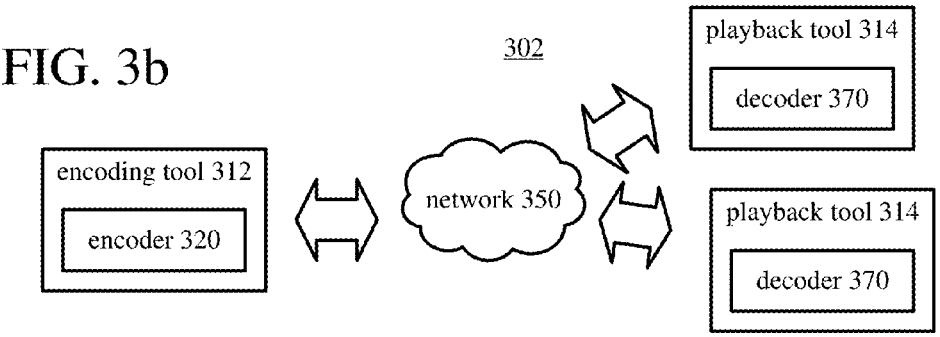

FIGS. 3a and 3b show example network environments (301, 302) that include video encoders (320) and video decoders (370). The encoders (320) and decoders (370) are connected over a network (350) using an appropriate communication protocol. The network (350) can include the Internet or another computer network.

In the network environment (301) shown in FIG. 3a, each real-time communication ("RTC") tool (310) includes both an encoder (320) and a decoder (370) for bidirectional communication. Although FIG. 3a shows a single RTC tool per node, the encoder (320) is part of a video capture tool, and the decoder (370) is part of a video playback tool. A given encoder (320) can produce output compliant with the H.265/HEVC standard, SMPTE 421M standard, ISO/IEC 14496-10 standard (also known as H.264/AVC), another standard, or a proprietary format such as VP8 or VP9, or a variation or extension thereof, with a corresponding decoder (370) accepting encoded data from the encoder (320). The bidirectional communication can be part of a video conference, video telephone call, or other two-party or multi-party communication scenario. Although the network environment (301) in FIG. 2a includes two RTC tools (310), the network environment (301) can instead include three or more RTC tools (310) that participate in multi-party communication.

An RTC tool (310) manages encoding by an encoder (320) and also manages decoding by a decoder (370). FIG. 4 shows an example decoder system (400) that can be included in the RTC tool (310). Alternatively, the RTC tool (310) uses another decoder system.

In the network environment (302) shown in FIG. 3b, an encoding tool (312) includes an encoder (320) that encodes video for delivery to multiple playback tools (314), which include decoders (370). The unidirectional communication can be provided for a video surveillance system, web camera monitoring system, remote desktop conferencing presentation or sharing, wireless screen casting, cloud computing or gaming, or other scenario in which video is encoded and sent from one location to one or more other locations. Although the network environment (302) in FIG. 3b includes two playback tools (314), the network environment (302) can include more or fewer playback tools (314). In general, a playback tool (314) communicates with the encoding tool (312) to determine a stream of video for the playback tool (314) to receive. The playback tool (314) receives the stream, buffers the received encoded data for an appropriate period, and begins decoding and playback.

The encoding tool (312) can include server-side controller logic for managing connections with one or more playback tools (314). A playback tool (314) can include client-side controller logic for managing connections with the encoding tool (312). FIG. 4 shows an example decoder system (400) that can be included in the playback tool (314). Alternatively, the playback tool (314) uses another decoder system.

IV. Example Decoder Systems.

FIG. 4 is a block diagram of an example video decoder system (400) in conjunction with which some described embodiments may be implemented. The video decoder system (400) includes a video decoder (450), which is further detailed in FIG. 5. As part of the decoding, the video decoder system (400) can use acceleration hardware (e.g., one or more GPUs) to perform various decoding operations and/or rendering operations.

The video decoder system (400) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The video decoder system (400) can be adapted for decoding of a particular type of content (e.g., screen capture video) or adapted for decoding of various types of content. The video decoder system (400) can be implemented as part of an OS module, as part of an application library, as part of a standalone application, as software executing in a browser environment, and/or using special-purpose hardware. Overall, the video decoder system (400) receives coded data from a channel (410) and produces reconstructed pictures as output for an output destination (490).

The reconstructed pictures can be produced at a frame rate of, for example, 30 frames per second. As used herein, the term "picture" generally refers to source, coded or reconstructed image data. For progressive-scan video, a picture is a progressive-scan video frame. For interlaced video, a picture can be an interlaced video frame or video field. FIG. 6a shows an example of interlaced video frame (601), which includes alternating lines from a top field and a bottom field. For interlaced video, an interlaced video frame might be de-interlaced prior to encoding. Alternatively, two complementary interlaced video fields are encoded together as a single video frame (601) or separately encoded as two fields, including a top field (602) and a bottom field (603). Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

Figure 6B:
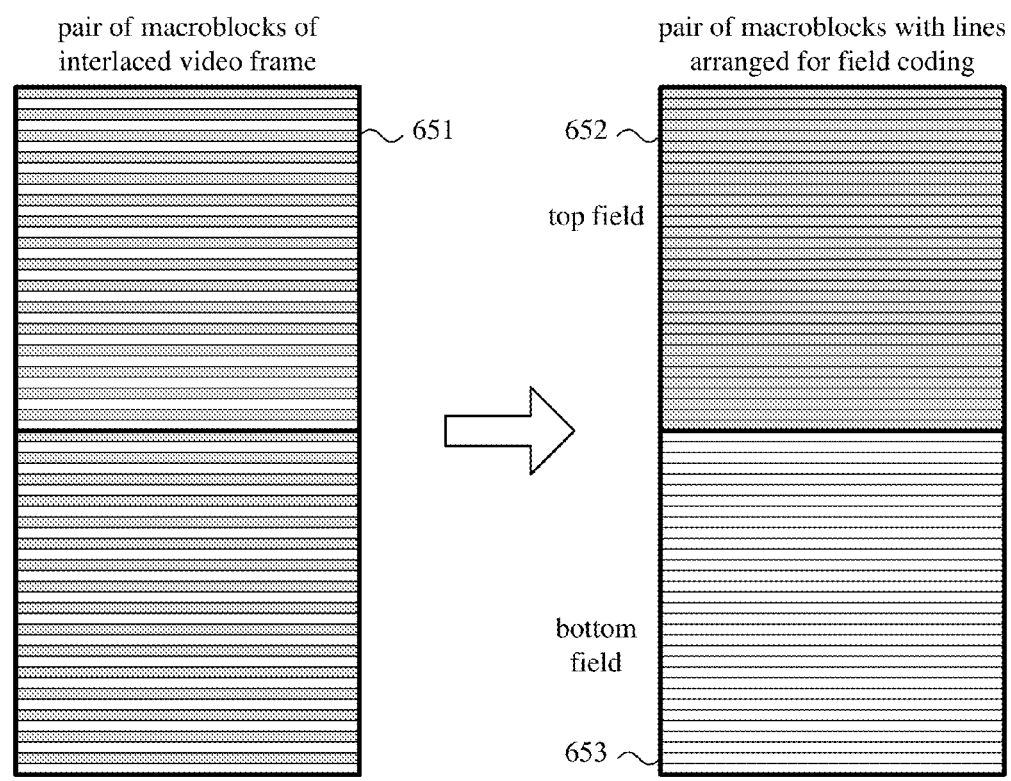

In some example implementations, an interlaced video frame can be encoded as a frame (601) or two fields (602, 603), or the decision to switch between field coding and frame coding can be made at a lower level. For example, FIG. 6b shows a pair (651) of macroblocks of an interlaced video frame. The pair (651) of macroblocks includes alternating lines from a top field and bottom field of the interlaced video frame. For purposes of coding and decoding, the top field lines can be separated from the bottom field lines, so that one or more blocks (e.g., macroblock (652) in FIG. 6b) include the top field lines, and another one or more blocks (e.g., macroblock (653) in FIG. 6b) include the bottom field lines.

In general, a pixel is the set of one or more collocated sample values for a location in a picture, which may be arranged in different ways for different chroma sampling formats. Typically, before encoding, the sample values of video are converted to a color space such as YUV, in which sample values of a luma (Y) component represent brightness or intensity values, and sample values of chroma (U, V) components represent color-difference values. The precise definitions of the color-difference values (and conversion operations between YUV color space and another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format).

During different stages of decoding and rendering, sample values of a picture may be represented in memory in a planar format or in a packed format. FIG. 7 shows an example (700) of sample values in a planar YUV format, in which sample values are stored in memory using separate arrays for different color components. A first array stores sample values (710) of the luma (Y) component, logically organized by location within the picture. A second array stores sample values (720) of the first chroma (U) component, logically organized by location within the picture. A third array stores sample values (730) of the second chroma (V) component, logically organized by location within the picture. In the example (700) of FIG. 7, the chroma sample values (720, 730) have been downsampled by a factor of two horizontally and vertically. (In practice, the sample values of a given color component can be represented in a one-dimensional array (row-after-row or column-after-column), not a two-dimensional array as shown in FIG. 7.) Thus, for the example (700) of planar YUV format shown in FIG. 7, sample values for a given pixel are represented in three different arrays in memory. Although FIG. 7 shows sample values stored in a planar YUV format, alternatively, some other type of texture values (e.g., transform coefficients, residual values) can be stored in the planar YUV format.

FIG. 8 shows an example (800) of sample values in a packed YUV format, in which sample values for a given pixel are collocated in memory. An array stores sample values (810) of the luma (Y) component interleaved with sample values of the chroma (U, V) components. In the example (800) of FIG. 8, chroma sample values have the same spatial resolution as luma sample values. Alternatively, a packed format can include sample values in another color space (such as RGB or GBR) after color space conversions, and can potentially include one or more additional values per pixel (e.g., an opacity value per pixel).

With reference to FIG. 4, the decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been organized for transmission or storage as a media stream (e.g., according to a media program stream or transport stream format such as ITU-T H.222.0|ISO/IEC 13818-1 or an Internet real-time transport protocol format such as IETF RFC 3550), in which case the channel decoder (420) can parse syntax elements added as part of the syntax of the media transmission stream. Or, the channel decoder (420) separates coded video data that has been organized for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data buffer (430) until a sufficient quantity of such data has been received. The coded data (421) includes coded pictures (431) and reference picture management information (432). The coded data (421) in the coded data buffer (430) contain, as part of the syntax of an elementary coded video bitstream, coded data for one or more pictures. The coded data (421) in the coded data buffer (430) can also include media metadata relating to the encoded video data (e.g., as one or more parameters in one or more supplemental enhancement information messages or video usability information messages).

In general, the coded data buffer (430) temporarily stores coded data (421) until such coded data (421) is used by the video decoder (450). At that point, coded data for a coded picture (431) and reference picture management information (432) are transferred from the coded data buffer (430) to the video decoder (450). As decoding continues, new coded data is added to the coded data buffer (430) and the oldest coded data remaining in the coded data buffer (430) is transferred to the video decoder (450).

Figure 5:
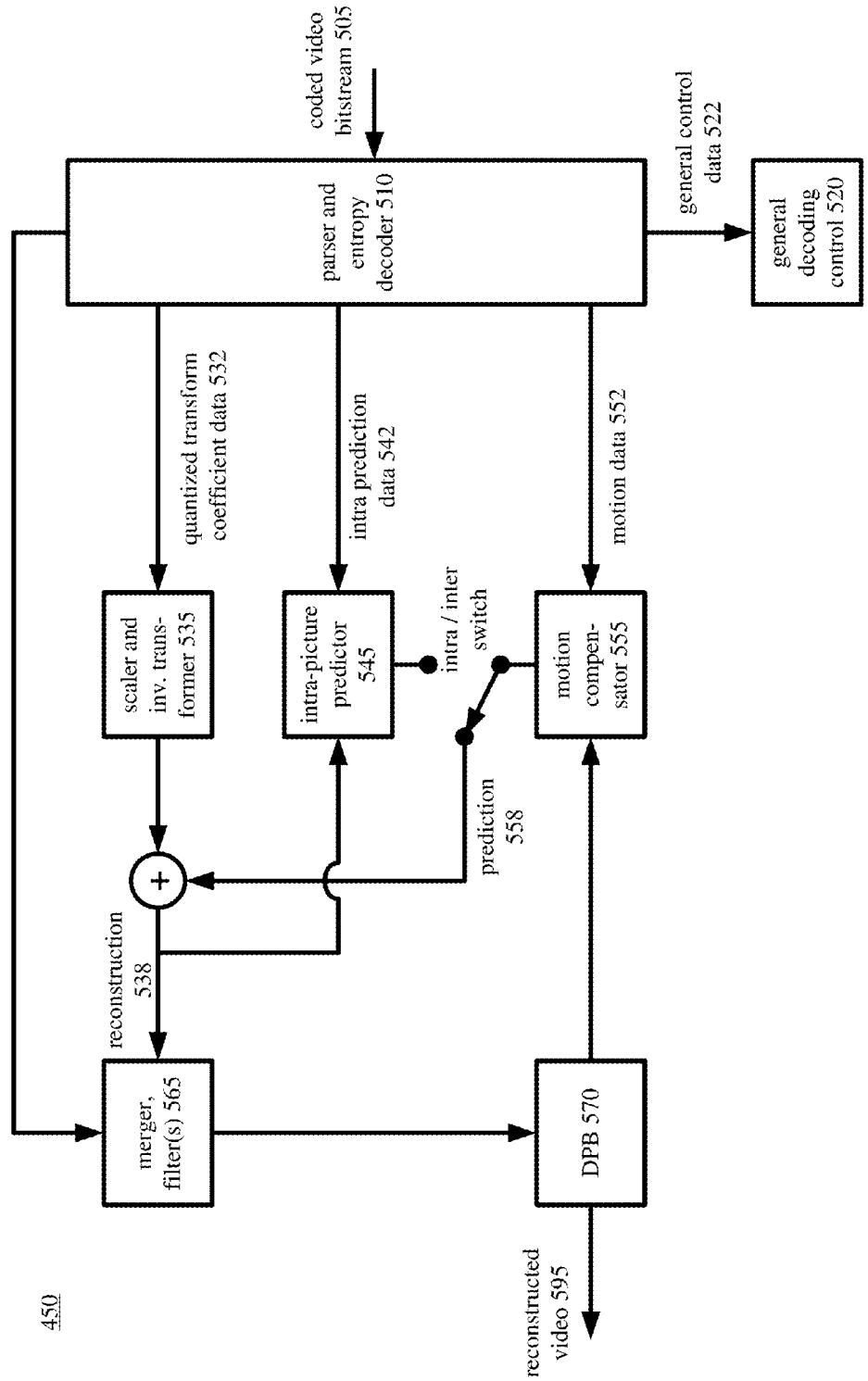
FIG. 5 is a diagram illustrating an example video decoder, in conjunction with which some described embodiments can be implemented.

The video decoder (450) decodes a coded picture (531) to produce a corresponding decoded picture (451). As shown in FIG. 5, the video decoder (450) receives the coded picture (431) as input as part of a coded video bitstream (505). The video decoder (450) produces the corresponding decoded picture (451) as output as reconstructed video (595).

The syntax of the coded video bitstream (elementary bitstream) is typically defined in a codec standard or format, or extension or variation thereof. The encoded data in the elementary bitstream includes syntax elements organized as syntax structures. In general, a syntax element can be any element of data, and a syntax structure is zero or more syntax elements in the elementary bitstream in a specified order.

Generally, the video decoder (450) includes multiple decoding modules that perform decoding tasks such as entropy decoding, inverse quantization, inverse frequency transforms, motion compensation, intra-picture prediction, and filtering. Many of the components of the decoder (450) are used for both intra-picture decoding (that is, decoding of intra-coded blocks) and inter-picture decoding (that is, decoding of inter-coded blocks). The exact operations performed by those components can vary depending on the type of information being decompressed. The format of the coded video bitstream (505) can be a Windows Media Video format, VC-1 format, MPEG-x format (e.g., MPEG-1, MPEG-2, or MPEG-4), H.26x format (e.g., H.261, H.262, H.263, H.264, H.265), or VPx format, or a variation or extension thereof, or some other format.

A picture can be organized into multiple tiles of the same size or different sizes. For example, a picture is split along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile can be further organized as blocks or other sets of sample values. Blocks may be further sub-divided at different stages. For example, a picture can be divided into 64×64 blocks, 32×32 blocks or 16×16 blocks, which can in turn be divided into smaller blocks of sample values.

For syntax according to the H.264/AVC standard, a picture can be partitioned into one or more slices of the same size or different sizes. A picture (or slice) is split into 16×16 macroblocks. A macroblock ("MB") includes luma sample values organized as four 8×8 luma blocks and corresponding chroma sample values organized as 8×8 chroma blocks. Generally, a MB has a prediction mode such as inter or intra. A MB includes one or more prediction units (e.g., 16×16 blocks, 16×8 blocks, 8×16 blocks, 8×8 blocks, 8×4 blocks, 4×8 blocks, or 4×4 blocks, which may be called partitions for inter-picture prediction) for purposes of signaling of prediction information (such as prediction mode details, motion vector ("MV") information, etc.) and/or prediction processing. A MB also has one or more residual data units for purposes of coding/decoding of residual values.

For syntax according to the H.265/HEVC standard, a picture (or slice or tile) is split into coding tree units. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (a YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (a YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU typically includes one or more prediction units for purposes of signaling of prediction information (such as prediction mode details, displacement values, etc.) and/or prediction processing. A prediction unit ("PU") has a luma prediction block ("PB") and two chroma PBs. A CU also typically has one or more transform units for purposes of coding/decoding of residual values, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs. A video encoder decides how to partition video into CTUs (CTBs), CUs (CBs), PUs (PBs) and TUs (TBs).

As used herein, the term "block" can indicate a partition, residual data unit, CTB, CB, PB or TB, or some other set of values, depending on context. The term "unit" can indicate a MB, CTU, CU, PU, TU or some other set of blocks, or it can indicate a single block, depending on context. The term "partition" can indicate a PU or other unit, or PB or other block.

With reference to FIG. 5, a buffer receives encoded data in the coded video bitstream (505) and makes the received encoded data available to the parser/entropy decoder (510). The parser/entropy decoder (510) entropy decodes entropy-coded data, typically applying the inverse of entropy coding performed in the encoder (e.g., context-adaptive binary arithmetic decoding with binarization). Thus, the parser/entropy decoder (510) decompresses quantized transform coefficient values as well as certain side information (e.g., MV information, QP values, mode decisions, parameter choices, filter parameters). Typical entropy decoding techniques include Exponential-Golomb decoding, Golomb-Rice decoding, context-adaptive binary arithmetic decoding, differential decoding, Huffman decoding, run length decoding, variable-length-to-variable-length decoding, variable-length-to-fixed-length decoding, Lempel-Ziv decoding, dictionary decoding, and combinations of the above. The entropy decoder can use different decoding techniques for different kinds of information, can apply multiple techniques in combination, and can choose from among multiple code tables within a particular decoding technique. In FIG. 5, as a result of parsing and entropy decoding, the parser/entropy decoder (510) produces general control data (522), quantized transform coefficient data (532), intra prediction data (542), motion data (552), and filter control data (562).

The general decoding control (520) receives the general control data (522). For example, the general control data (522) includes information indicating which reference pictures to retain in the decoded picture buffer ("DPB") (570). The general decoding control (520) provides control signals (not shown) to other modules (such as the scaler/inverse transformer (535), intra-picture predictor (545), motion compensator (555), and intra/inter switch) to set and change decoding parameters during decoding.

With reference to FIG. 4, as appropriate, when performing its decoding process, the video decoder (450) may use one or more previously decoded pictures (469) as reference pictures for inter-picture prediction. The video decoder (450) reads such previously decoded pictures (469) from a decoded picture temporary memory storage area (460), which is, for example, the DPB (570).

With reference to FIG. 5, if the given picture is predicted using inter-picture prediction, a motion compensator (555) receives the motion data (552), such as MV data, reference picture selection data and merge mode index values. A given picture can be entirely or partially coded using inter-picture prediction. An "inter-coded block" is a block coded using inter-picture prediction. The motion compensator (555) applies MVs to the reconstructed reference picture(s) from the DPB (570). For a given block at a location in the given picture, an MV indicates an offset from that location in a reference picture to a block of predicted sample values. The offset indicated by an MV can be an integer number of sample values or a fractional number of sample values (e.g., at a ½-sample offset, ¼-sample offset, or ⅛-sample offset). The motion compensator (555) produces predicted sample values (that is, motion-compensated prediction values) for inter-coded blocks of the given picture.

In a separate path within the video decoder (450), the intra-picture predictor (545) receives the intra prediction data (542), such as information indicating the prediction mode/direction used. A given picture can be entirely or partially coded using intra-picture prediction. An "intra-coded block" is a block coded using intra-picture prediction. For intra spatial prediction, using values of a reconstruction (538) of the given picture, according to the prediction mode/direction, the intra-picture predictor (545) spatially predicts sample values of a current block of the given picture from neighboring, previously reconstructed sample values of the given picture. Or, for intra block copy mode, the intra-picture predictor (545) predicts the sample values of a current block using previously reconstructed sample values of a reference block, which is indicated by an offset (block vector) for the current block.

The intra/inter switch selects values of a motion-compensated prediction or intra-picture prediction for use as the prediction (558) for a given block. For example, when H.265/HEVC syntax is followed, the intra/inter switch can be controlled based on a syntax element encoded for a CU of a picture that can contain intra-coded CUs and/or inter-coded CUs. When H.264/AVC syntax is followed, the intra/inter switch can be controlled based on a syntax element encoded for a MB of a picture. When residual values have been encoded/signaled, the video decoder (450) combines the prediction (558) with reconstructed residual values to produce the reconstruction (538) of the content from the video signal. When residual values have not been encoded/signaled, the video decoder (550) uses the values of the prediction (558) as the reconstruction (538).

The video decoder (450) also reconstructs residual values. To reconstruct residual values, when they have been encoded/signaled, the scaler/inverse transformer (535) receives and processes the quantized transform coefficient data (532). In the scaler/inverse transformer (535), a scaler/inverse quantizer performs inverse scaling and inverse quantization on the quantized transform coefficients. The scaler/inverse transformer (535) sets values for QP for a picture, tile, slice and/or other portion of video based on syntax elements in the bitstream. An inverse frequency transformer performs an inverse frequency transform, producing blocks of residual values or sample values. For example, the inverse frequency transformer applies an inverse block transform to frequency transform coefficients, producing sample values or residual values. The inverse frequency transform can be an inverse DCT, an integer approximation thereof, or another type of inverse frequency transform (e.g., an inverse discrete sine transform or an integer approximation thereof), and can have a variable block size. If the frequency transform was skipped during encoding, the inverse frequency transform is also skipped. In this case, the scaler/inverse quantizer can perform inverse scaling and inverse quantization on blocks of residual values (or sample values), producing reconstructed sample values. The video decoder (450) combines reconstructed residual values with values of the prediction (558), producing sample values of the reconstruction (538).

For intra-picture prediction, the values of the reconstruction (538) can be fed back to the intra-picture predictor (545). For inter-picture prediction, the values of the reconstruction (538) can be further filtered. In the merger/filter(s) (565), the video decoder (450) merges content from different tiles into a reconstructed version of the picture. The video decoder (450) selectively performs deblock filtering and SAO filtering according to the filter control data (562) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the video decoder (450) or a syntax element within the encoded bitstream data. The DPB (570) buffers the reconstructed current picture for use as a reference picture in subsequent motion-compensated prediction.

The video decoder (450) can also include a post-processing filter. The post-processing filter can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter is applied to reconstructed sample values outside of the motion compensation loop, before output for display.

Post-processing can also include upsampling of chroma sample values and/or color space conversion. As part of post-processing, when chroma sample values have been downsampled for encoding, the chroma sample values can be replicated or filtered to upsample the chroma sample values to the original chroma sample resolution, such that chroma resolution matches luma resolution. As part of post-processing, sample values can be converted from a YUV format to another format such as RGB or GBR. The sample values in the destination color format (e.g., RGB, GBR) can also include opacity values (sometimes called alpha values and designated with the letter a, as in RGBa).

With reference to FIG. 4, the decoded picture temporary memory storage area (460) includes multiple picture buffer storage areas (461, 462, . . . , 46n). The decoder (450) uses the reference picture management information (432) to identify a picture buffer (461, 462, etc.) in which it can store a decoded picture (451). The decoder (450) stores the decoded picture (451) in that picture buffer. In a manner consistent with the reference picture management information (432), the decoder (450) also determines whether to remove any reference pictures from the multiple picture buffer storage areas (461, 462, . . . , 46n).

An output sequencer (480) identifies when the next picture to be produced in display order (also called output order) is available in the decoded picture storage area (460). When the next picture (481) to be produced in display order is available in the decoded picture storage area (460), it is read by the output sequencer (480) and output to the output destination (490) (e.g., display). In general, the order in which pictures are output from the decoded picture storage area (460) by the output sequencer (480) (display order) may differ from the order in which the pictures are decoded by the decoder (450) (bitstream order).

Depending on implementation and the type of decompression desired, modules of the video decoder system (400) and/or video decoder (450) can be added, omitted, split into multiple modules, combined with other modules, and/or replaced with like modules. In alternative embodiments, decoder systems or decoders with different modules and/or other configurations of modules perform one or more of the described techniques. Specific embodiments of decoder systems typically use a variation or supplemented version of the video decoder system (400). Specific embodiments of video decoders typically use a variation or supplemented version of the video decoder (450). The relationships shown between modules within the video decoder system (400) and video decoder (450) indicate general flows of information in the video decoder system (400) and video decoder (450), respectively; other relationships are not shown for the sake of simplicity. In general, a given module of the video decoder system (400) or video decoder (450) can be implemented by software executable on a CPU, by software controlling special-purpose hardware (e.g., graphics hardware for video acceleration), and/or by special-purpose hardware (e.g., in an ASIC).

V. Efficient Decoding and Rendering of Inter-Coded Blocks in a Graphics Pipeline.

This section describes innovations in video decoding and rendering operations for inter-coded blocks in a graphics pipeline, in which at least some of the operations are performed using a graphics processing unit ("GPU"). The innovations can speed up the process of decoding and rendering video content, which is especially useful for scenarios such as remote desktop presentation, e.g., using remote desktop protocol ("RDP"), or real-time conferencing.

In some remote desktop presentation scenarios, a browser connects to a server in order to provide a remote desktop presentation connection. Decoding and/or rendering operations can be provided through program code (e.g., JavaScript code) executable in a browser environment for any compatible browser (e.g., HTML5-compatible browser), without requiring any plugins or client-side decoding software outside the browser environment. As such, the browser-based code may be executable on a variety of OSs and platforms (e.g., smartphone, tablet, laptop computer), without any platform-specific or OS-specific modifications. For newer codec standards and formats such as the H.264 standard, H.265 standard, VP8, and VP9, however, performing video decoding and rendering operations using such browser-based code can be challenging. In particular, the CPU(s) available on a platform might not be powerful enough to support low-latency decoding, especially for high-quality video (e.g., high frame rate, high spatial resolution, low distortion).

In some example implementations, a video playback tool uses a GPU to perform at least some video decoding and rendering operations. The video playback tool can support low-latency performance for remote desktop presentation, real-time conferencing, or other scenarios, even for high-quality video. The video playback tool can use browser-based code that works in any compatible browser (e.g., HTML5-compatible browser) without any client-side plugins or decoding software outside the browser environment. Or, the video playback tool can include native code. In some example implementations, by using specialized graphics primitives and shader routines executable in a GPU to perform block operations in parallel, overall latency is reduced. In particular, this configuration can speed up the process of decoding and rendering inter-coded blocks, and merging the blocks from memory in a planar YUV format into actual locations in a display buffer in a packed YUV format.

The innovations described herein include, but are not limited to, the following.

Using a graphics primitive (e.g., point sprite) to represent texture values for an inter-coded block as a point in a graphics pipeline. In this case, the texture values are sample values. The graphics primitive can have any of various attributes descriptive of the block represented by the graphics primitive. For example, an MV attribute can indicate a location in a reference picture in a reference buffer for motion compensation operations. When multiple reference pictures are available for motion compensation, different reference buffers can store different reference pictures. As another example, a block size attribute can indicate dimensions of texture values (e.g., 8×8, 16×16, or some other size) for the represented block as a single texture coordinate. As another example, a residual index attribute can indicate the position of residual values for the represented block in GPU memory (e.g., in planar YUV format). As another example, a display index attribute can indicate the position of texture values for the represented block in a display buffer (e.g., in a packed format after merger of reconstructed blocks of a picture). Different graphics primitives can be used for luma and chroma blocks, potentially having different sizes (e.g., 16×16 for luma, and 8×8 for chroma) and different MV attributes.

For interlaced video content, using other attributes descriptive of the block represented by a graphics primitive. For example, a flag can indicate whether a given inter-coded block is field-coded or frame-coded, and another flag can indicate whether the block, if field-coded, is associated with a top field or bottom field. For decoding of interlaced video content, two fields can be stored in different reference buffers, or a single reference buffer can store alternating lines from the two fields.

Using shader routines executable in a GPU to transfer texture values from GPU memory to a display buffer and perform other rendering operations and/or decoding operations for inter-coded blocks in a graphics pipeline. After sample values for inter-coded blocks have been gathered in GPU memory, a shader routine can, for different blocks in parallel, scatter sample values to appropriate destination locations in the display buffer.

Using a vertex shader routine to determine, for different inter-coded blocks in parallel, locations in a reference buffer for motion-compensated prediction values. For a given inter-coded block, the vertex shader routine can determine the location of predicted sample values in the reference buffer. The vertex shader routine can use an MV attribute of a graphics primitive to determine the location in the reference buffer.

Using a vertex shader routine to determine, for different inter-coded blocks in parallel, locations in a display buffer for texture values. For a given block, the vertex shader routine can determine a location in the display buffer. The vertex shader routine can use a display index attribute of a graphics primitive to determine the destination location in the display buffer for the texture values, which can have dimensions of 8×8, 16×16, etc.

In a graphics pipeline, computing interpolated sample values when MVs have fractional-sample offsets. In some example implementations, for some fractional-sample offsets, the decoder performs filtering with a filter having multiple taps (e.g., 6 taps). For other fractional-sample offsets, the decoder performs bilinear filtering (e.g., with blending operations). Interpolation can be performed in multiple stages. For example, the decoder interpolates sample values for all positions at ½-sample offset horizontally or vertically (and an integer-sample offset in the other dimension), but interpolate sample values only as needed (on demand) for other positions (e.g., at ¼-sample offsets).

Using a fragment shader routine to calculate, for different inter-coded blocks in parallel, motion-compensated prediction values. The inter-coded blocks can have different sizes (e.g., 16×16, 8×8, 4×4), which facilitates motion compensation for partitions having non-uniform sizes. Motion compensation operations can be performed in multiple passes associated with sets of inter-coded blocks having different block sizes (e.g., a pass for 16×16 blocks, a pass for 8×8 blocks, and a pass for 4×4 blocks). Partitions of other sizes (e.g., 16×8, 8×16, 8×4, or 4×8, or for asymmetric motion partitioning ("AMP") according to the H.265 standard, 4×16, 12×16, 16×4, 16×12, and so on) can be handled using graphics primitives having one of a smaller set of block sizes (e.g., 16×16, 8×8, 4×4). For different inter-coded blocks in parallel, the fragment shader routine can combine predicted sample values with residual values.

The various innovations can be used in combination or separately.

A. Examples of Inter-Coded Blocks.

In block-based video coding/decoding, inter-picture prediction can exploit temporal redundancy between neighboring pictures to reduce bit rate. For example, for a current block of a picture, a video encoder finds a matching block in a previously encoded/reconstructed picture. The sample values of the matching block provide predicted sample values for the current block. In contrast, intra-picture prediction exploits spatial redundancy within a given picture to reduce bit rate. Whether intra-picture prediction or inter-picture prediction is used, the video encoder can encode the differences (residual values) between the sample values of the current block and predicted sample values for the current block.

Figure 9:
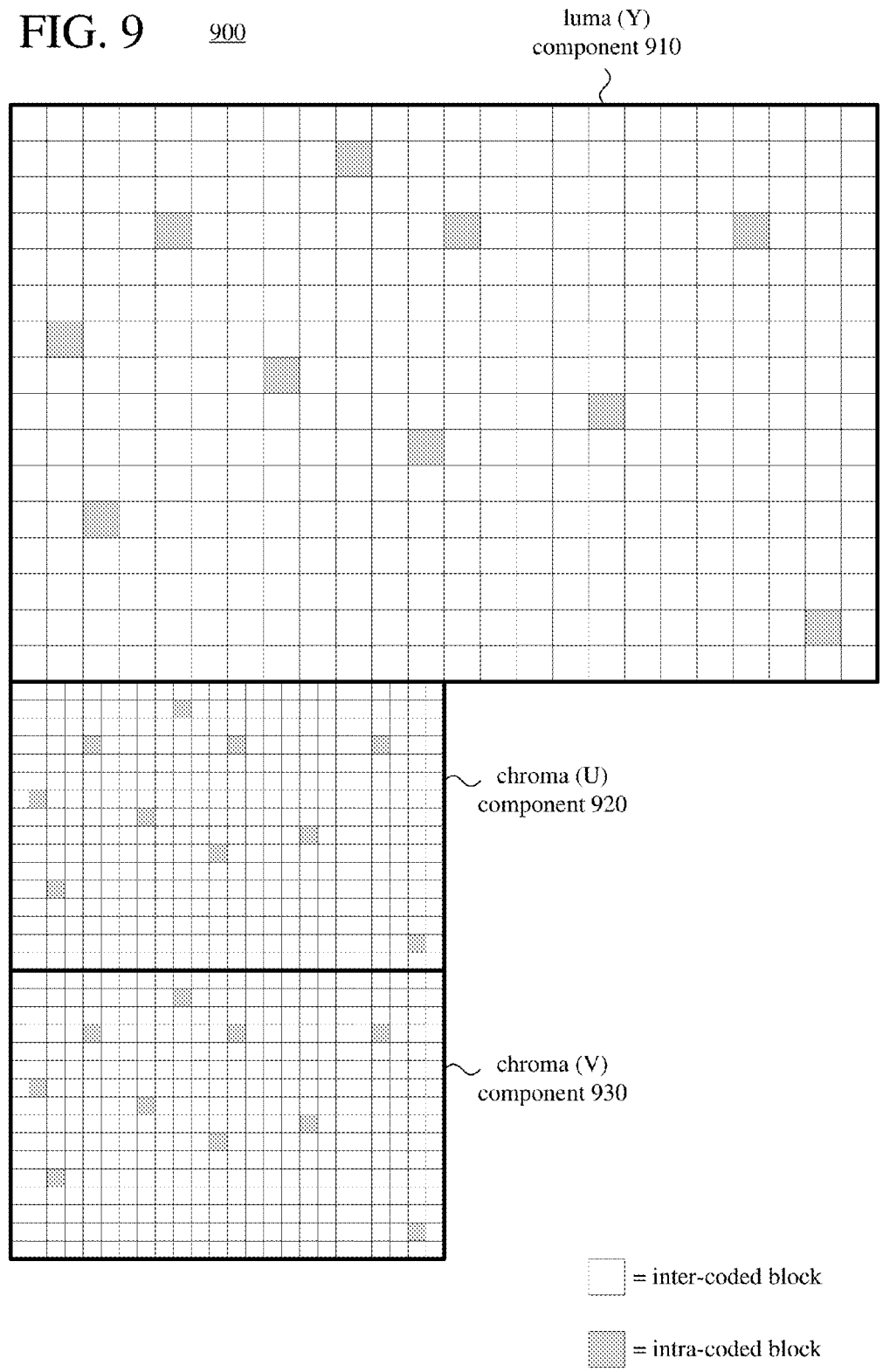
FIG. 9 is a diagram illustrating an example of intra-coded blocks and inter-coded blocks of a picture.

In some example implementations, units (e.g., MBs, CUs) can be encoded using intra-picture prediction (resulting in intra-coded blocks) or inter-picture prediction (resulting in inter-coded blocks). In some video codec standards and formats, a given picture can include a mix of inter-coded blocks and intra-coded blocks. This may be the case, for example, when inter-picture prediction is successful for most areas of the given picture (e.g., due to predictable motion or absence of motion in those areas), but fails for a few areas of the given picture (e.g., due to a new object appearing or complex motion). In the example (900) of FIG. 9, intra-coded blocks are shown as shaded blocks, and inter-coded blocks are shown as non-shaded blocks. The sample values of the blocks are in a planar format. The sample values of the luma (Y) component (910), first chroma (U) component (920), and second chroma (V) component (930) are in separate arrays. The innovations described herein can be used for inter-coded blocks.

B. Examples of Decoding and Rendering Operations Using CPU(s) and GPU.

Figure 10:
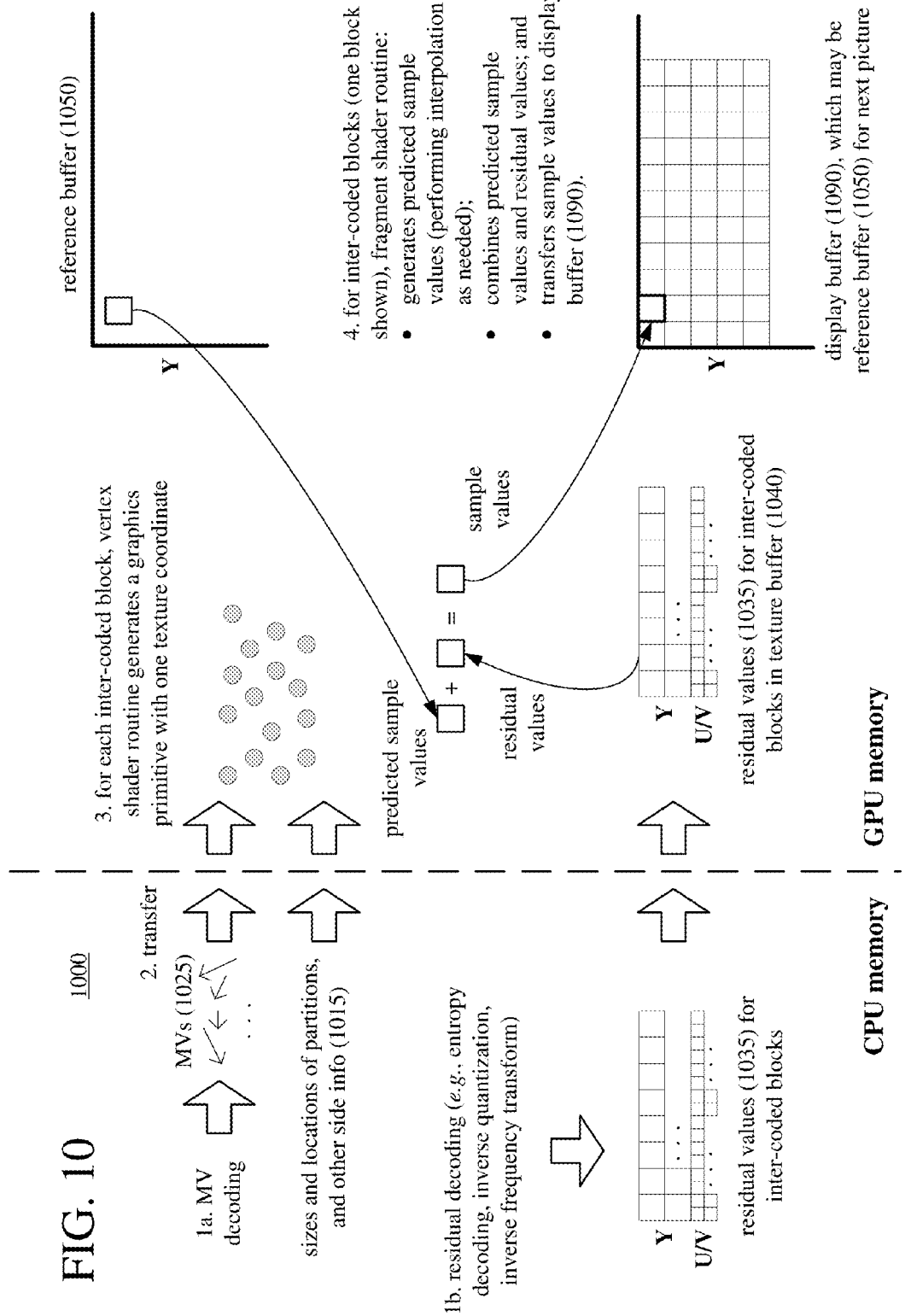
FIG. 10 is a diagram illustrating an example of decoding and rendering of inter-coded blocks using one or more CPUs and a GPU.

FIG. 10 shows an example (1000) of decoding and rendering of inter-coded blocks using one or more CPUs and a GPU. In the example (1000), decoding operations are split between the CPU(s) and the GPU.

With the CPU(s), a host decoder receives and parses encoded data in a bitstream. The host decoder decodes syntax elements that indicate parameters such as sizes and locations of motion-compensation partitions as well as other side information (1015) for inter-coded blocks of a picture. The host decoder buffers such side information (1015) in CPU memory. With the CPU(s), the host decoder also decodes and reconstructs MVs (1025) for the partitions. The host decoder buffers the MVs (1025) in CPU memory. The host decoder decodes residuals, if any, for inter-coded blocks of the picture, performing operations such as entropy decoding, inverse quantization, and inverse frequency transforms. The host decoder buffers residual values (1035) for the inter-coded blocks in CPU memory in a planar YUV format. The luma (Y) component includes some number of inter-coded blocks for inter-coded units (e.g., MBs, CUs). Each chroma (U, V) component includes that number of inter-coded blocks for those inter-coded units. For video in a YUV 4:2:0 format, the chroma (U, V) components are downsampled by a factor of two horizontally and vertically. For example, each inter-coded block of the luma component is a 16×16 block, and each inter-coded block of the chroma components is an 8×8 block.

The host decoder loads the side information (1015), MVs (1025), and residual values (1035) from CPU memory into GPU memory. The side information (1015) can be packed into contiguous memory locations before transfer (and remain in contiguous memory locations after transfer), so that memory is not used for blocks lacking the side information (e.g., intra-coded blocks). Or, a buffer for the side information (1015) can include memory locations for side information for each block, and the memory locations are empty for any block lacking the side information. Similarly, the MVs (1025) can be packed into contiguous memory locations before transfer (and remain in contiguous memory locations after transfer), or a buffer can include memory locations for the MVs (1025) for all blocks, even those without any MV. For residual values (1035) of inter-coded blocks, values for a given component (e.g., Y, U, or V) can be packed into contiguous memory locations before transfer (and remain in contiguous memory locations after transfer), or a buffer can include memory locations for the residual values for all blocks of the given component, even those without any residual values. Residual values for inter-coded blocks of a given component can be contiguous with, or separated from, the residual values for inter-coded blocks of the other components. An offset value can indicate an offset in CPU memory (or GPU memory) from the start of residual values for the luma component to the start of residual values for a chroma component. Residual values for a luma component can be transferred from CPU memory to GPU memory in the same pass as residual values for chroma components. Alternatively, residual values for the luma component and residual values for the chroma components can be transferred in different passes.

After this transfer, the GPU memory stores the side information (1015), MVs (1025), and residual values (1035). A texture buffer (1040) in the GPU memory stores the residual values (1035) for inter-coded blocks. The GPU memory includes one or more other buffers that store one or more previously reconstructed pictures. For example, the reference buffer (1050) stores a previously reconstructed picture for use as a reference picture. Although FIG. 10 shows a single reference buffer (1050), GPU memory can include multiple reference buffers storing multiple reference pictures. An inter-coded block can be predicted from a single reference picture (e.g., so-called single predictive or unidirectional motion compensation), with different inter-coded blocks in a picture potentially being predicted from different reference pictures. Or, an inter-coded block can be predicted from multiple reference pictures (e.g., so-called bi-predictive or bidirectional motion compensation). Pictures can be arranged according to hierarchical patterns of reference picture dependencies, for functionality such as temporally scalable coding/decoding and hierarchical bidirectional coding/decoding.

The GPU memory also includes a display buffer (1090), which stores the reconstructed version of the current picture. For decoding of subsequent pictures, the display buffer (1090) may be a reference buffer (1050).

A vertex shader routine executes on the GPU. For each of the inter-coded blocks, the vertex shader routine generates a graphics primitive with one texture coordinate. For example, the graphics primitive is a point sprite representing a 16×16 luma block, 8×8 luma block, 8×8 chroma block, 4×4 chroma block, or block of some other size. To represent an inter-coded block, the graphics primitive can include attributes such as MV data for the block, a reference to the residual values for the block, and a reference to the location for the block within the picture. For example, using one of the MVs (1025) transferred from CPU memory, the vertex shader routine can compute a reference to the reference buffer (1050) for a motion-compensated prediction block for an inter-coded block, then store the reference as the MV attribute of a graphics primitive. The reference can be a pointer, memory address, (x, y) coordinates, or other indication of location/offset in a reference buffer. When finding the reference to the reference buffer (1050), the vertex shader routine can use a reference picture identifier (from encoded data in the bitstream) to select one of several available reference buffers. For the MV attribute, the reference to the reference buffer (1050) can implicitly indicate one of multiple reference buffers used in motion compensation for an inter-coded block (e.g., with a memory address or pointer as the MV attribute). Alternatively, a buffer index attribute can expressly identify the reference buffer (and reference picture) used in motion compensation for the block (e.g., with (x, y) coordinates or another indication of location/offset within a reference picture as the MV attribute).

The vertex shader routine can also compute a reference (such as a pointer, memory address, (x, y) coordinates, or other indication of location/offset) to the texture buffer (1040) for residual values for the inter-coded block, then store the reference as a "residual index" attribute of the graphics primitive. Similarly, the vertex shader routine can compute a reference to the display buffer (1090) for the inter-coded block, then store that reference as a "display index" attribute of the graphics primitive. The next section describes examples of graphics primitives. The vertex shader routine can generate graphics primitives for multiple inter-coded blocks in parallel.

A fragment shader routine also executes on the GPU. For each of the inter-coded blocks, the fragment shader routine performs various operations. Using the MV attribute of an inter-coded block, the fragment shader routine generates predicted sample values for the inter-coded block. For example, the fragment shader routine retrieves sample values from the reference buffer (1050). Or, if the MV attribute indicates motion at fractional-sample resolution, the fragment shader routine performs interpolation at fractional-sample offsets between sample values of a reference picture to determine the predicted sample values for the inter-coded block. Examples of interpolation operations are described below in section V.E. When an inter-coded block has been encoded using motion compensation from multiple reference pictures (e.g., for bi-predictive or bidirectional motion compensation), the fragment shader routine generates predicted sample values for the block from each of the multiple reference pictures then blends the predicted sample values.

The multiple reference pictures can be identified expressly (e.g., using buffer indices) or implicitly (e.g., using MV attributes that indicate the reference buffers for the respective reference pictures). Using the residual index attribute of the inter-coded block, the fragment shader routine retrieves residual values, if any, for the inter-coded block. The fragment shader routine combines the predicted sample values with the residual values, producing reconstructed sample values for the inter-coded block. When summing a predicted sample value and corresponding residual value, the fragment shader routine can "saturate" or clip the result (e.g., to the range of 0 . . . 255 for 8-bit values, or to some other range). The fragment shader routine transfers the sample values to the display buffer (1090). The next section describes examples of decoding and rendering operations that use graphics primitives. Using the graphics primitives, the fragment shader routine can process multiple inter-coded blocks in parallel.

C. Example Graphics Primitives and GPU Operations Using the Primitives.

According to approaches described in this section, texture values for an inter-coded block are represented, with a graphics primitive, as a point for processing by a GPU. Such graphics primitives can be used to define sample values for inter-coded blocks. A single graphics primitive can represent, as a point, an 8×8 block, 16×16 block, or other size of block for operations by the GPU, which provides an efficient way to represent inter-coded blocks in the graphics pipeline. In many cases, graphics primitives for multiple blocks can be processed in parallel (e.g., with shader routines executed by the GPU), which speeds up processing.

In some example implementations, the graphics primitive that represents, as a point, texture values for a given inter-coded block is a point sprite. A point sprite is a generalization of generic point that enables an arbitrary shape to be rendered as defined by texture values associated with the point sprite. Point sprites are supported in WebGL, OpenGL, and other graphics APIs and architectures for GPU processing. Using point sprites can simplify shader code. Alternatively, the graphics primitive is some other type of graphics primitive.

For H.264 decoding, the inter-coded block having a graphics primitive can correspond to a motion-compensation partition (e.g., having a size of 16×16, 16×8, 8×16, 8×8, 8×4, 4×8, or 4×4), or part of a motion-compensation partition. Or, for H.265 decoding, the inter-coded block having a graphics primitive can correspond to a PB (e.g., having a size of 64×64, 64×32, 32×64, 32×32, 32×16, 16×32, 16×16, 16×8, 8×16, 8×8, 8×4, 4×8, 4×4, or some other size for regular partitioning, or having a size of 8×32, 24×32, 32×8, 32×24, 4×16, 12×16, 16×4, 16×12, and so on, for AMP), or part of a PB. Alternatively, the inter-coded block having a graphics primitive can correspond to a residual block (H.264) or TB (H.265) associated with a transform block size, in which case an MV of an associated partition or PB can be shared by graphics primitives for multiple residual blocks/TBs.

Figure 11:
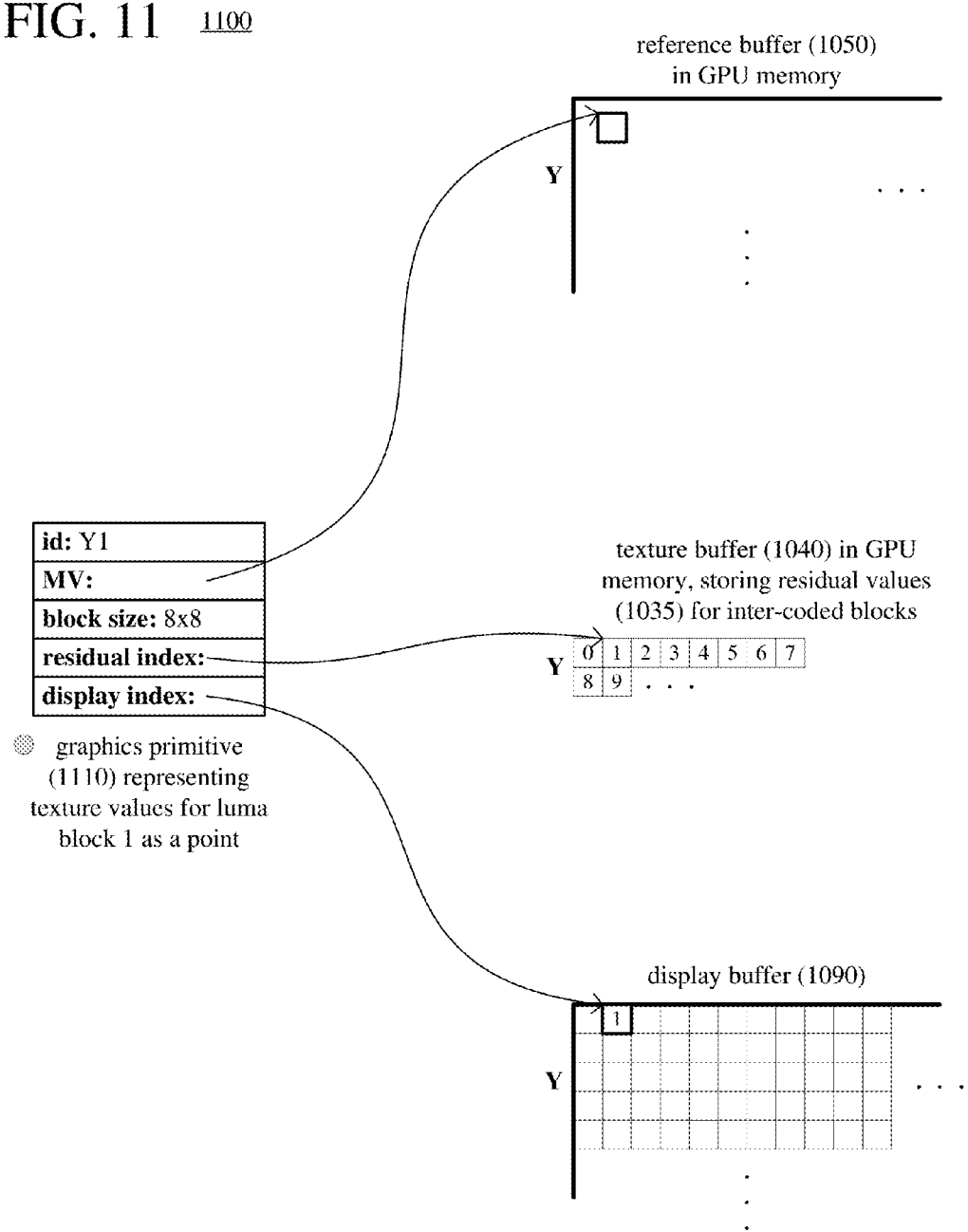
FIG. 11 is a diagram illustrating an example of a graphics primitive that represents, as a point, texture values for a given inter-coded block for processing by a GPU.

FIG. 11 shows an example (1100) of a graphics primitive (1110) that represents, as a point, texture values for a given inter-coded block for processing by a GPU. In the example (1100) of FIG. 11, the given inter-coded block is a luma block (shown as luma block 1). The graphics primitive (1110) has multiple attributes.

The first attribute ("id") of the graphics primitive (1110) is an identifier for the graphics primitive (1110). The identifier can be a GUID, object identifier, block identifier, or other identifier of the inter-coded block whose texture values are represented by the graphics primitive (1110). Alternatively, graphics primitives can be stored in an array, in which case the index value of a given graphics primitive in the array can be used to identify that graphics primitive, and the number of graphics primitives (or blocks) is tracked.

The second attribute of the graphics primitive (1110) is an MV attribute that indicates location of predicted sample values for the inter-coded block in a reference buffer (1050) in GPU memory. In logical terms, the MV attribute is, for example, a vector indicating a horizontal motion component and vertical motion component. In FIG. 11, the MV attribute represents an MV having the value (−1.25, 4). The possible MV resolution can depend on the standard or format for encoded data (e.g., ½-sample, ¼-sample, ⅛-sample), and can be different for different types of blocks (e.g., luma versus chroma). The MV attribute can directly store the MV value, but more generally stores a reference (such as a pointer, memory address, (x, y) coordinates, or other location/offset) to a reference buffer such as the reference buffer (1050) shown in FIGS. 10 and 11. When the graphics primitive (1110) is generated, a vertex shader routine can determine the MV attribute by resolving an MV transferred from CPU memory (and possibly other information such as a reference picture identifier) into a reference to a reference buffer. When multiple reference pictures are available, the MV attribute can expressly indicate a selection among the multiple reference pictures (e.g., as a pointer or memory address), or a separate buffer index attribute can indicate a selection among the multiple reference pictures. The MV attribute can indicate zero motion, in which case the predicted sample values are collocated sample values in the reference picture.

In the example (1100) of FIG. 11, the third attribute is a block size for the graphics primitive (1110). In FIG. 11, the block size is 8×8. The graphics primitive (1110) represents luma texture values for an 8×8 inter-coded block of the picture. Alternatively, the block size can have another value, such as 4×4 or 16×16 for H.264 coding/decoding, or 4×4, 16×16, or 32×32 for H.265 coding/decoding. Alternatively, the block size can have some other arbitrary value.

In FIG. 11, the fourth attribute of the graphics primitive (1110) is a residual index value that indicates location of residual values, if any, for the inter-coded block in a texture buffer (1040) in GPU memory. The residual index value is a reference (such as a pointer, memory address, (x, y) coordinates, or other location/offset) to the residual values in GPU memory for the inter-coded block represented by the graphics primitive (1110). For example, for the block Y1 (luma block 1), the residual index value references the GPU memory position that stores residual values for luma block 1, among the residual values (1035) of the inter-coded blocks for the picture in the texture buffer (1040) in GPU memory. In some cases (if the block has no residual values), the texture buffer (1040) lacks residual values for the block.

The fifth attribute of the graphics primitive (1110) is a display index value that indicates location of the inter-coded block in a display buffer (1090). The display index value is a reference (such as a pointer, memory address, (x, y) coordinates, or other location/offset) to the location of texture values in a display buffer (1090) for the inter-coded block represented by the graphics primitive (1110). In FIG. 11, the display index value references the position for luma block 1 in the display buffer (1090). Reconstructed sample values for luma block 1 will be written at that position in the display buffer (1090). The position indicated in the display buffer (1090) can be the same as the position of another buffer in CPU memory or GPU memory (e.g., storing residual values for a luma block, in which case the graphics primitive (1110) can include a single attribute indicating the locations in the texture buffer (1040) and display buffer (1090)).

Alternatively, instead of having a residual index value that indicates the location of residual values in GPU memory for an inter-coded block, a graphics primitive can have, as an attribute, the residual values themselves. For example, the graphics primitive stores, as one of its attributes, an array of residual values for an 8×8 block, 16×16 block, or other size of block.

A graphics primitive can include other and/or additional attributes. For example, an attribute of the graphics primitive can indicate a shape for the point (e.g., rectangle, square, circle). In some example implementations, the shape of the point is square. A partition, PB, etc. that is not square is split into multiple smaller inter-coded blocks, which are represented with graphics primitives associated with square block sizes. Examples of such spitting are described below. The attributes can include one or more parameters not used in the decoding process. For example, the attributes include a parameter that triggers processing of graphics primitives by the GPU. In some example implementations, the parameter is a lighting parameter normally used for fog or other special effects, which triggers processing of the graphics primitives by the GPU (e.g., blending residual values with predicted sample values in the GPU, or other addition/blending operations). Examples of additional attributes for inter-coded blocks of interlaced video content are described below.

Figure 12:
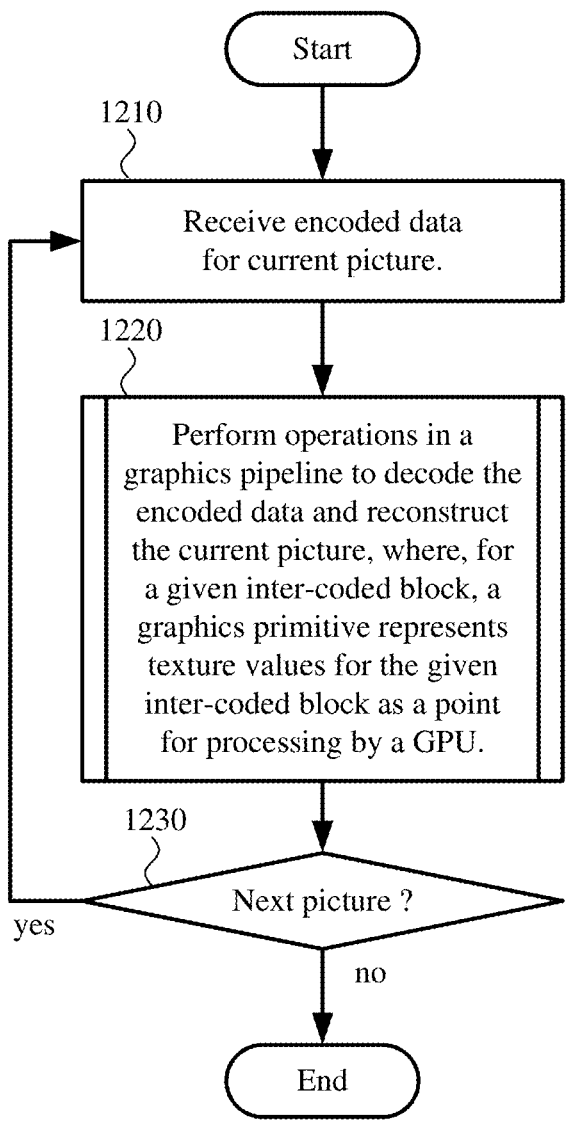
FIG. 12 is a flowchart illustrating a generalized technique for video decoding and rendering in a graphics pipeline, using a graphics primitive.

FIG. 12 shows a generalized technique (1200) for video decoding and rendering in which a graphics primitive represents texture values for a given inter-coded block as a point for processing by a GPU. The technique (1200) is performed by a video playback tool that includes a video decoder system, such as the video decoder system (400) described with reference to FIG. 4. The video decoder system can include one or more decoding routines executable in a browser environment running on a CPU, as well as one or more shader routines executable by a GPU. The decoding routine(s) executable in the browser environment and shader routine(s) executable by the GPU can be downloaded to the browser environment from a server, then executed locally.

The video playback tool receives (1210) encoded data for a current picture. The video playback tool can store the encoded data in a buffer (e.g., a coded data buffer, in CPU memory, configured to store the encoded data). The current picture can be, for example, a progressive video frame, interlaced video frame, or field of an interlaced video frame.

The video playback tool performs (1220) operations to decode the encoded data and reconstruct the current picture. For example, the video playback tool includes a video decoder system configured to perform the operations. In performing the operations, for a given inter-coded block of multiple inter-coded blocks of the current picture, a graphics primitive represents texture values for the block as a point for processing by a GPU. The graphics primitive is, for example, a point sprite. The graphics primitive can have attributes such as one or more of the attributes described with reference to FIG. 11. For interlaced video content, the graphics primitive can also have attributes such as one or more of the attributes described with reference to FIG. 23. The inter-coded block can be part of a MB, part of a CU, or part of some other unit of video. In some example implementations, the texture values for the given inter-coded block are sample values of the block.

The video playback tool checks (1230) whether to continue with decoding for the next picture and, if so, receives (1210) encoded data for the next picture. For the sake of simplicity, FIG. 12 does not show other aspects of decoding.

FIG. 13 illustrates an example of transfer of texture values, represented by a graphics primitive, from GPU memory to a display buffer for a picture. The transfer is part of GPU decoding and rendering operations, which can be performed using one or more shader routines. Although FIG. 13 illustrates operations for a single block, the operations can be performed in parallel for different blocks of a given unit or blocks of different units.

In the example (1300) of FIG. 13, a graphics primitive (1110) represents texture values for block Y1 as a point. During decoding and rendering operations in the GPU, the point is transformed by resizing it to the block size (and shape) indicated for the point in the graphics primitive (1110). In FIG. 13, the block size is 8×8. The resized point is further transformed by mapping predicted sample values to it, using the MV attribute of the graphics primitive (1110) to locate the predicted sample values associated with the point in GPU memory. If the MV attribute indicates a fractional-sample offset, the predicted sample values are determined by interpolation, e.g., as described in section V.E. FIG. 13 shows an enlarged view (1320) of the predicted sample values for block Y1 after this transform. The resized point is also transformed by mapping residual values to it, using the residual index value of the graphics primitive (1110) to locate the residual values associated with the point in GPU memory. FIG. 13 shows an enlarged view (1330) of the residual values for block Y1 after this transform. The predicted sample values and residual values for block Y1 are combined (e.g., by a blending operation), producing reconstructed sample values for the block Y1. FIG. 13 shows an enlarged view (1340) of the reconstructed sample values for the block Y1. In the example (1300) of FIG. 13, the predicted sample values, residual values, and reconstructed sample values are in a planar YUV 4:2:0 format. The sample values for block Y1 are transferred to the display buffer (1090), using the display index value of the graphics primitive (1110) to locate the appropriate positions in the display buffer (1090). In FIG. 13, the display buffer is in a planar YUV format, including separate arrays for different color components.

In the example (1300) of FIG. 13, a block of luma sample values is reconstructed. Blocks of chroma sample values can similarly be reconstructed. For chroma blocks, GPU rendering operations can incorporate chroma upsampling. For example, one graphics primitive can represent sample values for a luma block Y1 as a point, and two other graphics primitives can represent sample values for chroma blocks U1 and V1, respectively, as points. In decoding and rendering operations in the GPU, each of the three points is transformed as described with reference to FIG. 13. For video in a planar YUV 4:2:0 format, the size of the chroma blocks is ½ the size of the luma block horizontally and vertically. Therefore, the reconstructed sample values for the chroma blocks are upsampled by a factor of 2 horizontally and vertically. The sample values for three blocks can be merged into a single display buffer that stores the sample values in a packed color component format, using the display index values of the respective graphics primitives to locate the appropriate positions in the display buffer. The sample values in the display buffer can be in a packed YUV 4:4:4 format or, after color space conversion operations, a packed RGB format or packed RGBa format.

In the examples of FIGS. 10-13, a graphics primitive (e.g., point sprite) represents texture values for a block. There is a 1:1 ratio between graphics primitives and blocks whose texture values are represented by the graphics primitives. Alternatively, a given graphics primitive (e.g., point sprite) can represent texture values for a single unit that includes multiple blocks (e.g., for a MB or CU). In this case, for example, the graphics primitive can include multiple block size attributes (one block size attribute per block), multiple residual index attributes or texture arrays (one residual index attribute or texture array per block), and one or more display index attributes. When all blocks of the unit have the same MV, the graphics primitive for the blocks can have a single MV attribute. Alternatively, different graphics primitives can be used to represent predicted sample values and residual values. For example, one set of graphics primitives represents motion-compensation partitions or prediction units (with attributes such as MV attributes, block size attributes, and display index attributes) and another set of graphics primitives represents blocks of residual values (with attributes such as block size attributes, residual index values, and display index attributes).

D. Examples of Shader Routines in a Graphics Pipeline.

Figure 14:
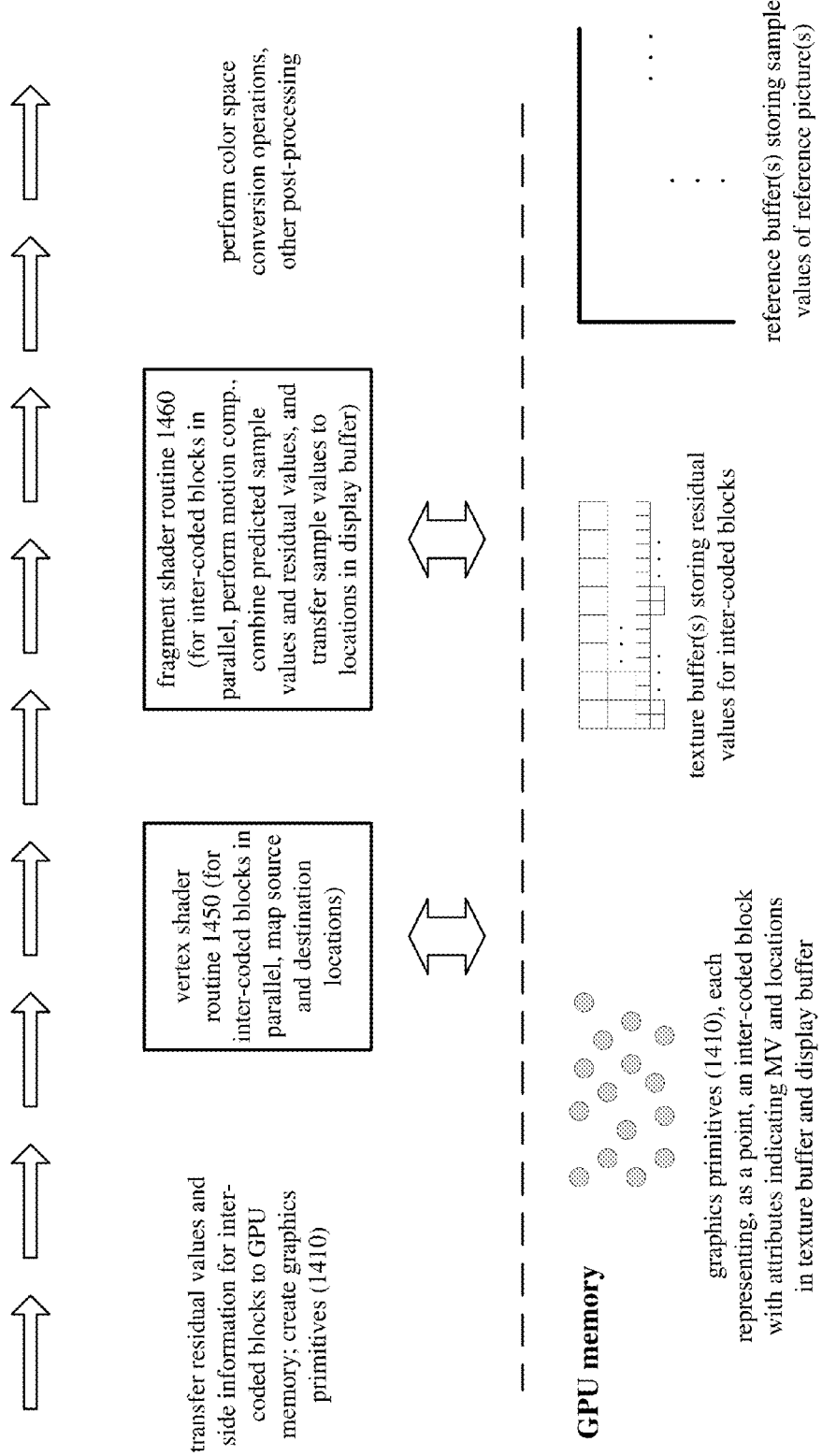
FIG. 14 is a diagram illustrating an example of shader routines executing in a GPU to perform decoding and rendering operations for inter-coded blocks.

According to approaches described in this section, one or more shader routines are executed in a GPU to perform decoding operations on sample values of inter-coded blocks in GPU memory, and to transfer the sample values from GPU memory to one or more display buffers. FIG. 14 shows an example (1400) of shader routines executing in a GPU to perform decoding and rendering operations for inter-coded blocks. The shader routines are highly parallelized, typically operating on multiple blocks in parallel.

To start, residual values, MV values, sizes and locations of partitions, and other side information are transferred from CPU memory to GPU memory. One or more texture buffers in GPU memory store the residual values for inter-coded blocks. The texture buffer(s) in GPU memory are accessible to the shader routines.

Separately, one or more reference buffers in GPU memory store sample values of one or more previously reconstructed reference pictures. The reference buffer(s) in GPU memory are accessible to the shader routines.

A set of graphics primitives (1410) is created in GPU memory to represent the texture values for the multiple inter-coded blocks. For example, the graphics primitives are point sprites, as described in section V.C or section V.G. Each of the graphics primitives can represent, as a point, an inter-coded block with attributes indicating an MV (location in one of the reference buffer(s)), a block size, a location in one of the texture buffer(s), a location in one of the display buffer, etc. The set of graphics primitives (1410) in GPU memory is accessible to the shader routines.

Conventionally, a GPU uses a vertex shader routine for rasterization. The vertex shader routine determines a position to which values will be rendered, and it determines how to perform the rendering. In FIG. 14, a GPU executes a vertex shader routine (1450) to map source locations (in the reference buffer(s) and in the texture buffer(s)) to destination locations (in the display buffer) for multiple blocks in parallel. With the vertex shader routine (1450), the GPU processes multiple graphics primitives (1410) in parallel. For example, for multiple inter-coded blocks in parallel, the vertex shader routine (1450) uses MV attributes of the respective graphics primitives (1410) to find locations of predicted sample values in the reference buffer(s). When multiple reference buffers store different reference pictures, buffer index attributes can be used to select among the multiple reference buffers (if MV attributes do not implicitly indicate which reference buffers to use). Similarly, the vertex shader routine (1450) uses the residual index attributes of the respective graphics primitives (1410) to find the locations of residual values in the texture buffer(s), and it uses the display index attributes of the respective graphics primitives (1410) to find locations in the display buffer(s). The vertex shader routine (1450) can use the block size attributes of the graphics primitives (1410) when setting up coordinates in the display buffer(s) to which sample values will be transferred. Thus, the vertex shader routine (1450) prepares for sample values of inter-coded blocks to be merged into one or more destination bitmaps in the display buffer(s).

Conventionally, a GPU uses a fragment shader routine (also called a pixel shader routine) to perform actual rendering operations. In FIG. 14, a GPU executes a fragment shader routine (1460) to decode and transfer sample values for inter-coded blocks in parallel to scattered locations in a display buffer. With the fragment shader routine (1460), the GPU processes multiple graphics primitives (1410) in parallel. For example, the fragment shader routine (1460) loads predicted sample values for multiple inter-coded blocks in parallel (performing motion compensation), loads residual values for the multiple inter-coded blocks in parallel, and combines predicted sample values and residual values for the multiple inter-coded blocks in parallel. The fragment shader routine (1460) can perform the motion compensation operations (and other operations) in multiple passes associated with different block sizes, as described in section V.F (e.g., in a first pass, performing operations in parallel for multiple inter-coded blocks having a first block size; in a second pass, performing operations in parallel for multiple inter-coded blocks having a second block size; and so on).

The fragment shader routine (1460) can use block size attributes and display index attributes of the respective graphics primitives (1410) when transferring sample values in GPU memory in a planar color component format (e.g., planar YUV format) to the appropriate coordinates in the display buffer(s). The fragment shader routine (1460) can transfer sample values for the inter-coded blocks in multiple passes. For example, the fragment shader routine (1460) loads sample values for luma blocks in parallel in first pass, and it loads texture values for chroma blocks in parallel in a second pass. When merging sample values into a display buffer in a packed color component format (e.g., packed YUV format), the fragment shader routine (1460) can use a color mask to control which sample values are updated in the two passes. In some example implementations, the color mask has four control parameters a, b, c, d for four sample values of a pixel in the display buffer. In the first pass, the color mask is ColorMask(1, 0, 0, 0), which enables writing of sample values at luma positions of pixels (but leaves values at chroma positions unchanged). In the second pass, the color mask is ColorMask(0, 1, 1, 0), which enables writing of sample values at chroma positions of the pixels (without overwriting the luma sample values that were written in the first pass).

With one or more shader routines (e.g., the fragment shader routine (1460)), the GPU can also perform chroma upsampling when transferring sample values for chroma blocks. Chroma sample values can simply be doubled horizontally and vertically to recover 4:4:4 video from 4:2:0 video. Alternatively, a shader routine can alternate chroma sample values in the display buffer, then use bilinear filtering or another lowpass filter on the chroma sample values for post-processing. Or, chroma sample values can be repeated or filtered in some other way as appropriate for some other rate of chroma upsampling.

In this way, luma sample values and chroma sample values for the respective positions can be merged into a packed YUV format. Using the luma sample values and chroma sample values, the GPU can execute one or more shader routines (e.g., the fragment shader routine (1460)) to perform color space conversion and/or other post processing operations. For example, values in a packed YUV format are converted to values in a packed RGB format or packed RGBa format. In the example (1400) of FIG. 14, the overall transformation is from a YUV planar format (different, separate planes of texture values for different color components) into a YUV packed format (one plane of sample values, with Y, U, and V sample values for a given position being adjacent) into an RGB packed format (after color space conversion, R, G, and B sample values, and perhaps an opacity value, for a given position being adjacent). Alternatively, the transformation is from a YUV planar format directly into an RGB or RGBa packed format.

FIG. 15*a* shows an example technique (1500) for video decoding and rendering of sample values of inter-coded blocks with one or more shader routines. The technique (1500) is performed by a video playback tool that includes a video decoder system, such as the video decoder system (400) described with reference to FIG. 4, as an example of the decoding and rendering stage (1220) of FIG. 12.

The video playback tool stores (1510) one or more reference pictures in one or more reference buffers in GPU memory. The video playback tool also stores (1520), in GPU memory, residual values for multiple inter-coded blocks of a picture. For a given one of the inter-coded blocks, a graphics primitive represents texture values for the given block as a point for processing by the GPU.

With a first shader routine, in parallel for multiple inter-coded blocks, respectively, the video playback tool maps (1530) source locations in one or more reference buffers and one or more texture buffers to destination locations in a display buffer. For example, the first shader routine is a vertex shader routine executable by the GPU, which can be used to perform, in parallel, operations for multiple inter-coded blocks represented by graphics primitives. FIG. 15*b* shows an example technique (1531) for mapping source locations to destination locations in multiple passes in the graphics pipeline. In a first pass, in parallel for multiple inter-coded blocks, respectively, the video playback tool resolves (1532) MVs into locations of predicted sample values in the reference buffer(s) in GPU memory. In doing so, the video playback tool can also determine what type of fractional interpolation, if any, to perform for the respective inter-coded blocks. In a second pass, the video playback tool, in parallel for multiple inter-coded blocks, respectively, determines (1533) locations of residual values in the texture buffer(s) in GPU memory. In a third pass, the video playback tool determines (1534) locations in the display buffer(s) for multiple inter-coded blocks, respectively, in parallel. Alternatively, the video playback tool maps source locations to destination locations in some other way.

Returning to FIG. 15*a*, with a second shader routine, in parallel for multiple inter-coded blocks, respectively, the video playback tool performs (1540) motion compensation, combines predicted sample values and residual values, and transfers sample values to locations in the display buffer. For example, the second shader routine is a fragment shader routine executable by the GPU, which can be used to perform, in parallel, operations for multiple inter-coded blocks represented by graphics primitives. FIG. 15*c* shows an example technique (1541) for performing operations of stage (1540) in multiple passes in the graphics pipeline. The video playback tool can perform some of the operations in multiple passes associated with different block sizes, as described in section V.F. With reference to FIG. 15*c*, in a first rendering pass, the video playback tool uses (1542) motion compensation to determine predicted sample values for multiple inter-coded blocks, respectively, in parallel. In doing so, the video playback tool can use MV attributes of graphics primitives for the blocks to determine locations in the reference buffer(s). The video playback tool can perform interpolation as needed for predicted sample values at fractional-sample offsets (e.g., as described in section V.E). The video playback tool can use buffer index attributes to select among multiple reference buffers (if MV attributes do not implicitly indicate which reference buffers to use). If a given block is predicted from multiple reference pictures (e.g., so-called bi-predictive or bidirectional motion compensation), the video playback tool can compute the predicted sample values from different reference pictures in the same pass or different passes, then blend the predicted sample values in another pass. In a second rendering pass, the video playback tool combines (1543) the predicted sample values and corresponding residual values for multiple inter-coded blocks, respectively, in parallel, reconstructing sample values for the blocks. In doing so, the video playback tool can use residual index attributes of graphics primitives to retrieve the residual values for the blocks. In a third rendering pass, the video playback tool selectively filters (1544) boundaries for multiple inter-coded blocks, respectively, in parallel. In addition to deblock filtering operations, the video playback tool can perform dering filtering operations and/or other filtering operations on the sample values. In a fourth rendering pass, in parallel for multiple inter-coded blocks, respectively, the video playback tool transfers (1545) the sample values to the display buffer(s). In doing so, the video playback tool can use display index attributes of graphics primitives to determine locations for the respective blocks. In a fifth, optional rendering pass, in parallel for multiple inter-coded blocks, respectively, the video playback tool performs (1546) chroma upsampling. In a sixth, optional rendering pass, in parallel for multiple inter-coded blocks, respectively, the video playback tool performs (1547) color space conversion. Alternatively, the video playback tool performs the operations of stage (1540) in some other way.

E. Examples of Interpolation Operations in a Graphics Pipeline.

In some cases, an MV defines motion having a fractional increment horizontally and/or vertically. For example, the fractional increment can be ½ sample, ¼ sample, or even ⅛ sample. A video playback tool performs interpolation operations to determine predicted sample values at fractional-sample offsets between sample values of a reference picture. This section describes examples of interpolation operations in a graphics pipeline. A shader routine such as a fragment shader routine executing on a GPU can perform the interpolation operations to determine predicted sample values at fractional-sample offsets. The predicted sample values can be part of an intermediate texture that is combined with residual values.

FIG. 16 shows examples of interpolation operations during video decoding. In FIG. 16, an arrangement (1600) of luma sample values includes luma sample values at integer-sample offsets and luma sample values at fractional-sample offsets. The luma sample values at integer-sample offsets, which are shaded, include luma sample values A-U. The luma sample values at fractional-sample offsets, which are not shaded, include luma sample values at ½-sample offsets and luma sample values at ¼-sample offsets. The filters used in interpolation are typically defined for a standard or format. In the examples of FIG. 16, sample values at fractional-sample offsets are determined using filter taps defined in the H.264 standard.

Positions cc, dd, h, m, ee, and ff have a ½-sample offset vertically and integer-sample offset horizontally. The predicted sample value at position h is interpolated using a six-tap filter applied to six sample values at integer-sample offsets in a column: h=((A−5C+20G+20M−5R+T)+16)>>5. The predicted sample values at positions cc, dd, m, ee, and ff are similarly interpolated.

Positions aa, bb, b, s, gg, and hh have a ½-sample offset horizontally and integer-sample offset vertically. The predicted sample value at position b is interpolated using a six-tap filter applied to six sample values at integer-sample offsets in a row: b=((E−5F+20G+20H−5I+J)+16)>>5. The predicted sample values at positions aa, bb, s, gg, and hh are similarly interpolated. The predicted sample value at position j, which has a ½-sample offset horizontally and a ½-sample offset vertically, can be interpolated using a six-tap filter applied to six sample values at ½-sample offsets in a row: j=((cc−5dd+20h+20m−5ee+ff)+16)>>5 or interpolated using a six-tap filter applied to six sample values at ½-sample offsets in a column: j=((aa−5bb+20b+20s−5gg+hh)+16)>>5.

Positions a, c, d, e, f, g, i, k, n, p, q, and r have a ¼-sample offset horizontally and/or vertically. (The term ¼-sample offset encompasses positions at a ¾-sample offset.) The predicted sample value at position a is interpolated using bilinear filtering applied to two adjacent sample values at integer-sample or ½-sample offsets in a row: a=(G+b+1)>>1. The predicted sample values at positions c, i, and k are similarly interpolated. The predicted sample value at position d is interpolated using bilinear filtering applied to two adjacent sample values at integer-sample or ½-sample offsets in a column: d=(G+h+1)>>1. The predicted sample value at positions f, n, and q are similarly interpolated. The predicted sample value at position e is interpolated using bilinear filtering applied to two diagonally adjacent sample values at ½-sample offsets: e=(b+h+1)>>1. The predicted sample values at positions g, p, and r are similarly interpolated.

With respect to interpolation between chroma sample values of reference pictures, chroma sample values at fractional-sample offsets can be calculated using bilinear filtering. Alternatively, for another standard or format, different filters are used to interpolate predicted sample values at fractional-sample offsets. For example, the filters have a different number of taps and/or different tap values. Or, interpolation can include a different number of stages.

FIG. 17 shows an example technique (1700) for video decoding and rendering in a graphics pipeline, in which interpolation uses a filter having multiple taps. The technique (1700) is performed by a video playback tool that includes a video decoder system, such as the video decoder system (400) described with reference to FIG. 4, as an example of the decoding and rendering stage (1220) of FIG. 12.

To start, the video playback tool stores (1710) sample values of a reference picture in a reference buffer in GPU memory. The video playback tool determines (1720) predicted sample values for multiple inter-coded blocks. In doing so, the video playback tool performs interpolation to determine predicted sample values at fractional-sample offsets. At least some of the interpolation uses a filter having multiple taps. For example, the filter is a 6-tap filtered as explained with reference to FIG. 16. Also, at least some of the interpolation can use bilinear filtering. Alternatively, different filters are used to interpolate predicted sample values at fractional-sample offsets.

Different inter-coded blocks may have different MVs associated with them. MVs for some blocks may reference integer-sample offsets (not requiring interpolation), while MVs for other blocks reference fractional-sample offsets (requiring interpolation). For a given inter-coded block, interpolation operations can be performed "on demand" if and when needed for motion compensation for the block. Alternatively, at least some interpolation operations can be performed preemptively for a reference picture or part of a reference picture. For example, a single reference buffer can store sample values at integer-sample offsets as well as interpolated sample values at all possible fractional-sample offsets for motion compensation. Or, using stages of interpolation, some interpolation can be performed preemptively for a reference picture or part of a reference picture, while other interpolation operations are performed on demand.

FIG. 18 shows an example (1800) of stages of interpolation when decoding inter-coded blocks in a graphics pipeline. A first reference buffer (1810) stores sample values at integer-sample offsets (e.g., positions A . . . U in FIG. 16). A second reference buffer (1820) stores sample values interpolated at positions with ½-sample offsets horizontally and integer-sample offsets vertically (e.g., positions aa, bb, b, s, gg, and hh in FIG. 16). A third reference buffer (1830) stores sample values interpolated at positions with ½-sample offsets vertically and integer-sample offsets horizontally (e.g., positions cc, dd, h, m, ee, and ff in FIG. 16). During a first stage of interpolation, the predicted sample values in the second reference buffer (1820) and third reference buffer (1830) can be determined by applying a 6-tap filter (as described with reference to FIG. 16) to the sample values in the first reference buffer (1810). The predicted sample values in the second reference buffer (1820) and third reference buffer (1830) can be determined preemptively for all positions of a reference picture or part of the reference picture during the first stage of interpolation.

For some MVs, the predicted sample values retrieved during motion compensation are stored in the first reference buffer (1810), second reference buffer (1820), or third reference buffer (1830). No additional interpolation is performed. For other MVs, however, additional interpolation operations are performed on demand for inter-coded blocks. In this case, during another stage of interpolation, sample values are interpolated as needed for other fractional-sample offsets. For example, sample values at positions with a ¼-sample offset horizontally and/or vertically (e.g., positions a, c, d, e, f, g, i, k, n, p, q, and r in FIG. 16) are interpolated on demand. Such predicted sample values can be interpolated by performing bilinear filtering between two adjacent sample values from the first reference buffer (1810), second reference buffer (1820), and/or third reference buffer (1830). Bilinear filtering can be implemented as a blending operation performed by a shader routine executing in the GPU. Sample values at positions with a ½-sample offset horizontally and vertically (e.g., position j in FIG. 16) are also interpolated on demand. Such predicted sample values can be interpolated by applying a 6-tap filter (as described with reference to FIG. 16) to sample values at ½-sample offsets vertically or horizontally (and integer-sample offsets in the other dimension).

Figure 19:
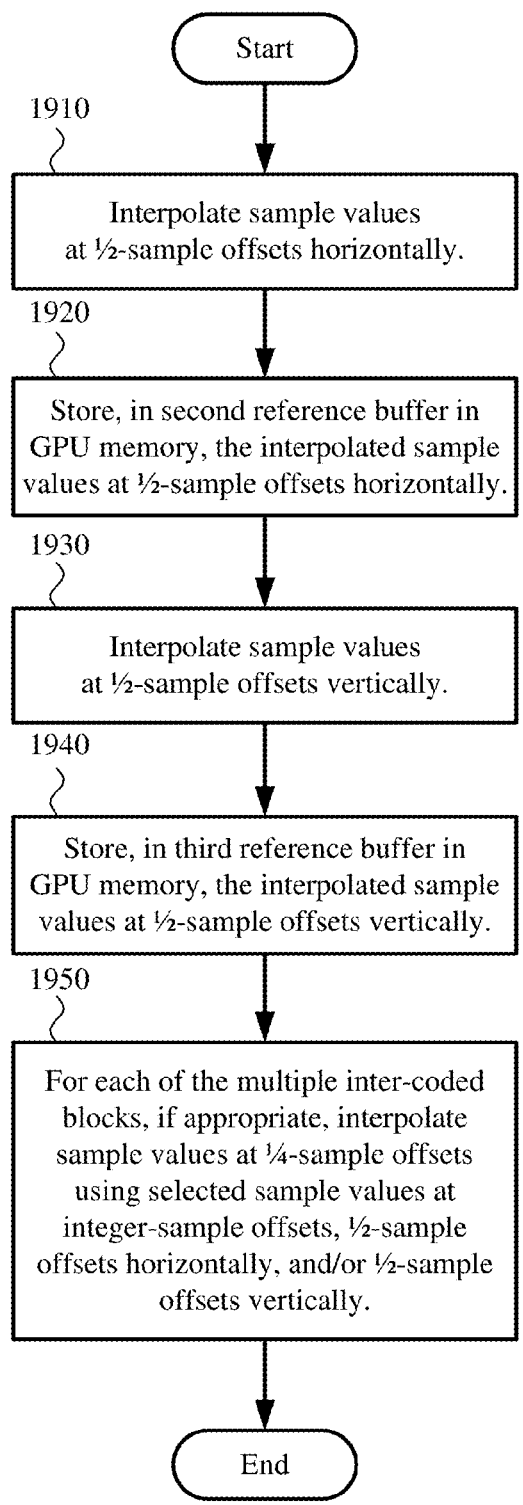
FIG. 19 is a flowchart illustrating an example technique for video decoding and rendering in a graphics pipeline, in which interpolation is performed in multiple stages.

FIG. 19 shows an example technique (1900) for video decoding and rendering in a graphics pipeline, in which interpolation is performed in multiple stages. The technique (1900) is performed by a video playback tool that includes a video decoder system, such as the video decoder system (400) described with reference to FIG. 4, as an example of the decoding and rendering stage (1220) of FIG. 12.

To start, a first reference buffer stores sample values at integer-sample offsets. When a current picture is decoded, the video playback tool interpolates (1910) first interpolated sample values at ½-sample offsets horizontally (and integer-sample offsets vertically) between at least some of the sample values at integer-sample offsets. The video playback tool stores (1920) the first interpolated sample values in a second reference buffer in GPU memory. The video playback tool also interpolates (1930) second interpolated sample values at ½-sample offsets vertically (and integer-sample offsets horizontally) between at least some of the sample values at integer-sample offsets. The video playback tool stores (1940) the second interpolated sample values in a third reference buffer in GPU memory. When calculating the first and second interpolated sample values, the video playback tool can use a filter having multiple taps, as described with reference to FIGS. 16-18. The video playback tool can perform the interpolating (1910, 1930) and storing (1920, 1940) operations preemptively for a reference picture or part of a reference picture, during a first stage of interpolation.

Then, for each of multiple inter-coded blocks, if appropriate, the video playback tool interpolates (1950) third interpolated sample values at ¼-sample offsets using selected sample values among the sample values at integer-sample offsets, the first interpolated sample values (at ½-sample offsets horizontally and integer-sample offsets vertically), and second interpolated sample values (at ½-sample offsets vertically and integer-sample offsets horizontally). When interpolating the third interpolated sample values, the video playback tool can use bilinear filtering, as described with reference to FIGS. 16-18. The video playback tool can perform the interpolating (1950) operations on demand for a given inter-coded block, during a second stage of interpolation.

F. Examples of Operations in Multiple Passes for Different Block Sizes.

In some example implementations, a shader routine executing in a GPU performs motion compensation, and potentially other operations, in multiple passes associated with different block sizes. For example, the shader routine performs motion compensation operations and operations to blend predicted sample values with residual values for 16×16 blocks in parallel in one pass, performs such operations for 8×8 blocks in parallel in another pass, and so on. In this way, the video playback tool can effectively exploit the parallel processing capabilities of the GPU by concurrently processing blocks of the same size. To facilitate such processing, a video playback tool sorts partitions into lists according to block size.

Figure 20A:
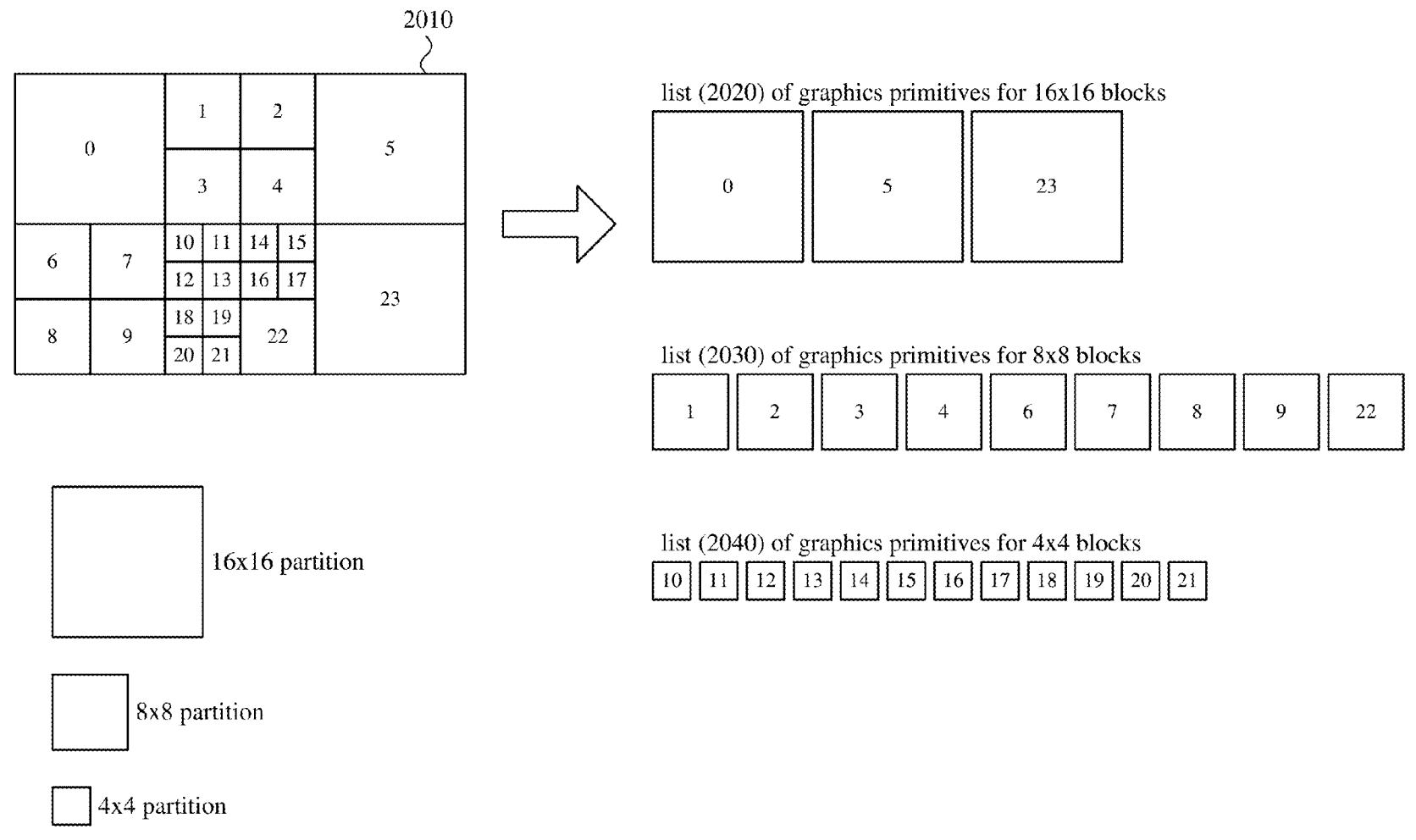

FIG. 20a shows part (2010) of a current picture having motion-compensation partitions of different sizes. In particular, the current picture includes 16×16 partitions, 8×8 partitions, and 4×4 partitions. The video playback tool represents the motion-compensation partitions with graphics primitives having different blocks size. A first list (2020) of graphics primitives with block size of 16×16 includes graphics primitives for partitions 0, 5, and 23. A second list (2030) of graphics primitives with block size of 8×8 includes graphics primitives for blocks 1-4, 6-9, and 22. A third list (2040) of graphics primitives with block size of 4×4 includes graphics primitives for blocks 10-21. In one pass, the video playback tool can perform operations for the three 16×16 blocks, respectively, in parallel. In another pass, the video playback tool can perform operations for the nine 8×8 blocks, respectively, in parallel. In another pass, the video playback tool can perform operations for the twelve 4×4 blocks, respectively, in parallel. Intra-coded blocks can similarly be sorted by block size into different lists of graphics primitives having different block sizes.

In some example implementations, graphics primitives have square block sizes (such as 16×16, 8×8, and 4×4), but motion-compensation partitions can have non-square, rectangular sizes (such as 16×8, 8×16, 8×4, 4×8, 8×32, 24×32, 32×8, 32×24, 4×16, 12×16, 16×4, 16×12, and so on). The video playback tool can handle this discrepancy in several ways.

Figure 20B:
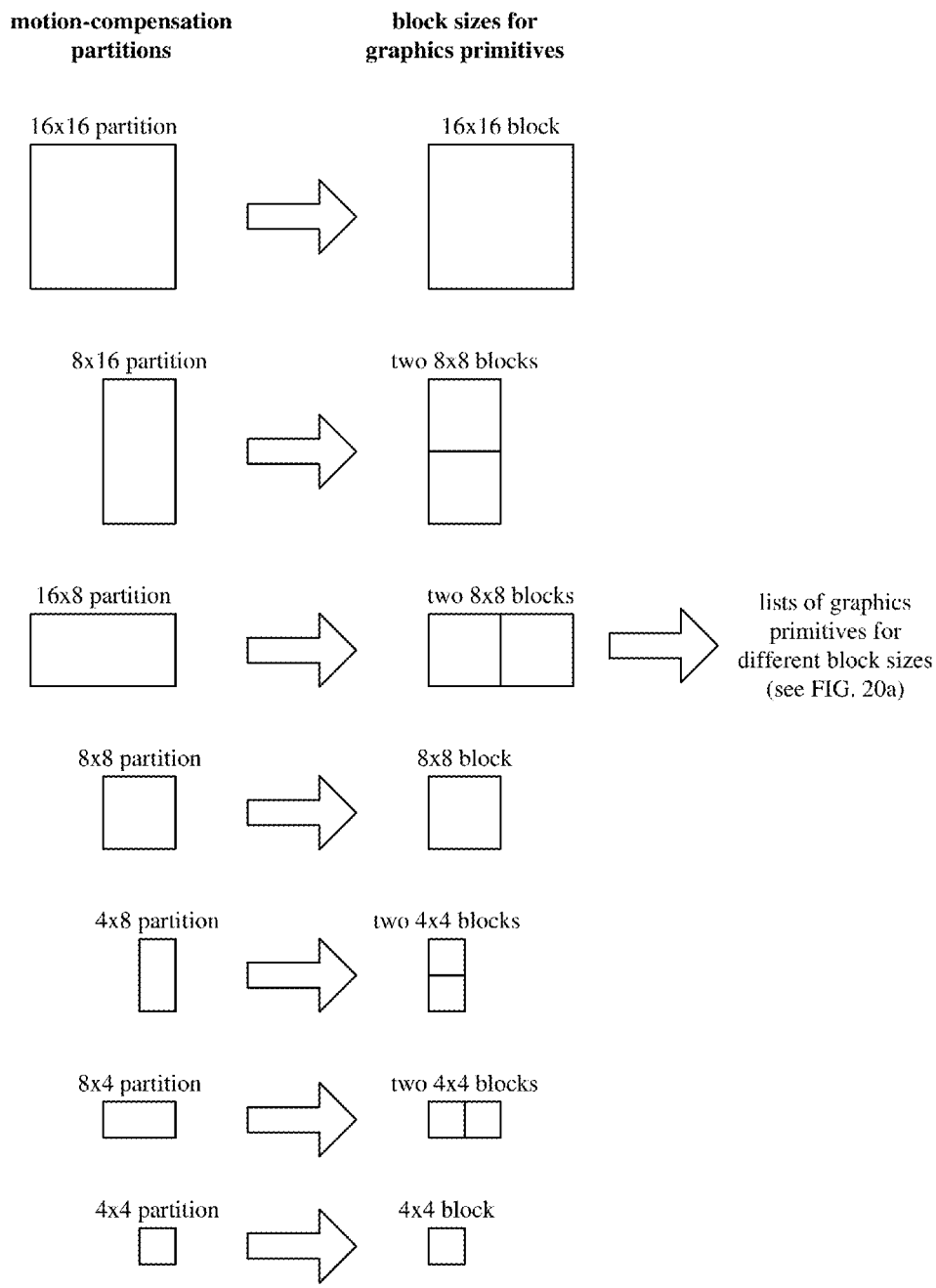

The video playback tool can represent a given motion-compensation partition with one or more graphics primitives, depending on the size of the motion-compensation partition. FIG. 20b shows examples (2050) of how a video playback tool can represent motion-compensation partitions with blocks of different sizes for graphics primitives. A 16×16 partition is represented by a graphics primitive having a block size of 16×16, an 8×8 partition is represented by a graphics primitive having a block size of 8×8, and a 4×4 partition is represented by a graphics primitive having a block size of 4×4. A 16×8 partition or 8×16 partition is represented with two graphics primitives, each having block size of 8×8. An 8×4 partition or 4×8 partition is represented with two graphics primitives, each having block size of 4×4. For other sizes of partitions (e.g., 8×32, 24×32, 32×8, 32×24, 4×16, 12×16, 16×4, 16×12, and so on), a partition can be represented with some number of graphical primitives having a square block size, which collectively fill the partition. The video playback tool can put such graphics primitives into different lists depending on block size (e.g., a first list for 16×16 blocks, a second list for 8×8 blocks, and a third list for 4×4 blocks, as described with reference to FIG. 20a).

Alternatively, the video playback tool can represent a given motion-compensation partition with a single graphics primitive having a block size (which includes the motion-compensation partition) and a mask attribute. For example, a 16×8 partition or 8×16 partition is represented with a single graphics primitive having block size of 16×16, and the mask attribute indicates the actual size of the partition. An 8×4 partition or 4×8 partition is represented with a single graphics primitive having block size of 8×8, and the mask attribute indicates the actual size of the partition. For other sizes of partitions (e.g., 8×32, 24×32, 32×8, 32×24, 4×16, 12×16, 16×4, 16×12, and so on), a partition can be represented with a single graphical primitive that encloses the partition, and a mask attribute that indicates the actual size of the partition. The video playback tool can use the mask attribute to limit how sample values are retrieved in motion compensation operations or limit how sample values are updated in blending operations.

FIG. 21 shows an example technique (2100) for video decoding and rendering in a graphics pipeline, in which motion compensation operations (and potentially other operations) are performed in multiple passes for blocks having different block sizes. The technique (2100) is performed by a video playback tool that includes a video decoder system, such as the video decoder system (400) described with reference to FIG. 4, as an example of the decoding and rendering stage (1220) of FIG. 12.

The video playback tool, e.g., with a vertex shader routine executing on a GPU, represents (2110) multiple partitions of a current picture as multiple inter-coded blocks. The multiple inter-coded blocks include multiple sets of inter-coded blocks associated with different block sizes (e.g., multiple lists of graphics primitives for the different block sizes). For example, if the size of a partition is square, the video playback tool uses one of the multiple blocks having a square size to represent the partition. Otherwise (the size of the partition is non-square), the video playback tool uses two or more of the multiple blocks to represent the partition.

The video playback tool, e.g., with a fragment shader routine executing on a GPU, performs (2120) motion compensation operations for the multiple inter-coded blocks in multiple passes. Each of the multiple passes is performed for a different one of the multiple sets of inter-coded blocks. The video playback tool can also perform other operations as part of the multiple passes, e.g., blending predicted sample values and corresponding residual values.

G. Examples of Adaptations for Interlaced Video Content.

For interlaced video content, decoding and rendering operations can be adapted in several respects. An interlaced video frame includes two fields—a top field and a bottom field. Depending on the standard/format followed and depending on decisions made during encoding, an interlaced video frame can be encoded as a single frame or as separate fields, as explained with reference to FIG. 6a. Or, groups of blocks can be selectively encoded in frame mode or field mode, as explained with reference to FIG. 6b.

FIG. 22 shows an example (2200) of buffering of reference pictures of interlaced video content. A reference buffer (2210) stores sample values for an interlaced video frame as alternating rows of sample values. This can simplify motion compensation operations when blocks of an interlaced video frame are frame-coded, since predicted sample values are drawn from alternating rows of sample values. On the other hand, the reference buffer (2220) stores sample values for a top field of an interlaced video frame, and a separate reference buffer (2230) stores sample values for a bottom field of the interlaced video frame. This can simplify motion compensation operations when fields of an interlaced video frame are separately coded, or when blocks of an interlaced video frame are field-coded, since predicted sample values are drawn from one field or the other field.

Figure 23:
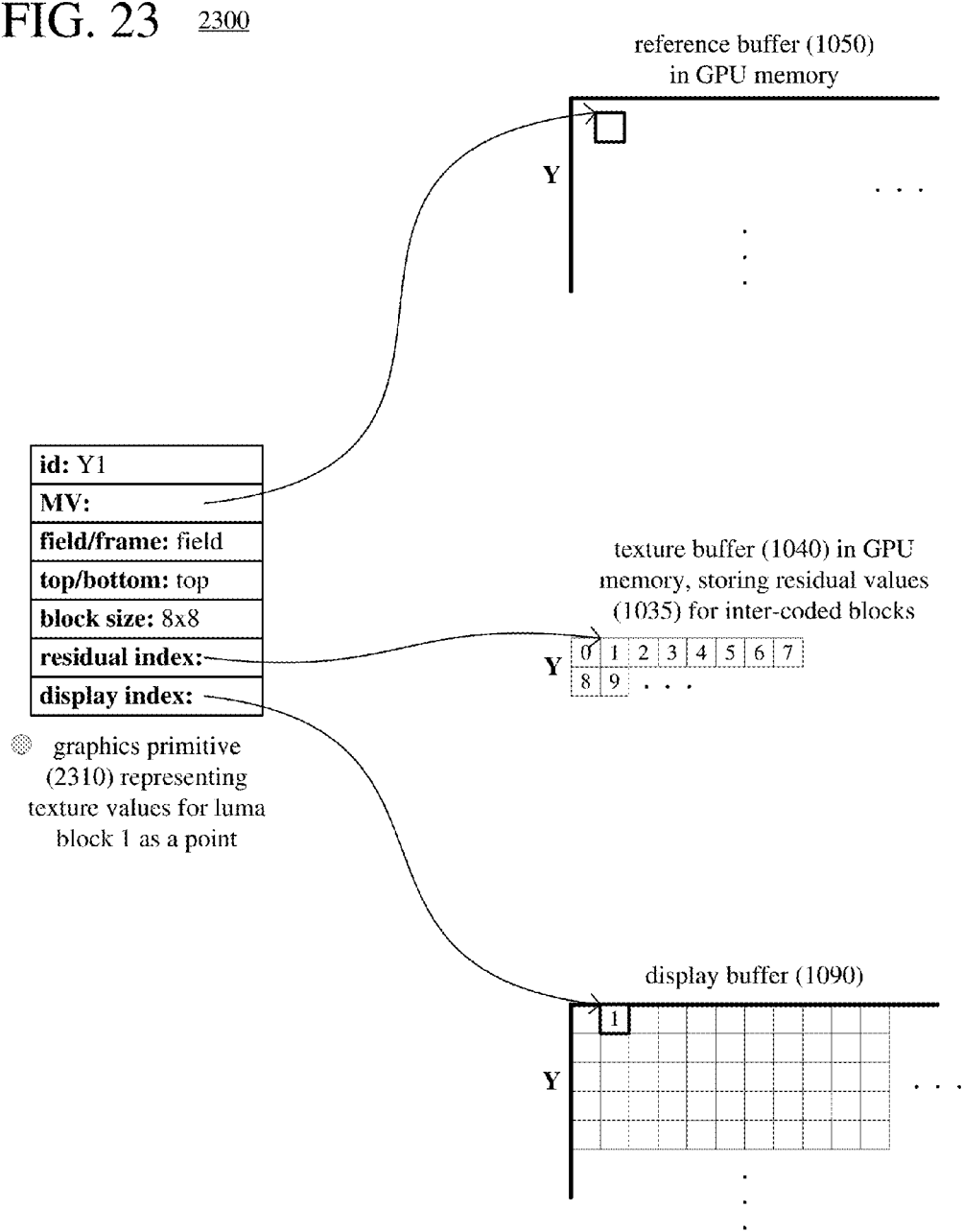
FIG. 23 is a diagram illustrating an example of a graphics primitive that represents, as a point, texture values for a given inter-coded block of interlaced video content for processing by a GPU.

A graphics primitive that represents an inter-coded block of interlaced video content can also be adapted. For example, a 16×16 block of interlaced video content can be represented by four graphics primitives, each having block size 8×8. FIG. 23 shows an example (2300) of a graphics primitive that represents, as a point, texture values for a given inter-coded block of interlaced video content for processing by a GPU. In the example (2300) of FIG. 23, the given inter-coded block is a luma block (shown as luma block 1). The graphics primitive (2310) has multiple attributes. The multiple attributes include an identifier, an MV attribute, a block size attribute, a residual index value attribute, and a display index value attribute, as described with reference to FIG. 11. The attributes of the graphics primitive (2310) also include a field/frame flag attribute that indicates whether the inter-coded block is field-coded or frame-coded. Further, if the block is field-coded, a top field/bottom field flag attribute indicates whether the block is associated with the top field or the bottom field. During decoding and rendering operations, a shader routine can use the field/frame flag attribute and top field/bottom field flag attribute to determine which reference picture(s) to use for motion compensation, and to determine positions of reconstructed sample values of the current picture.

Figure 24:
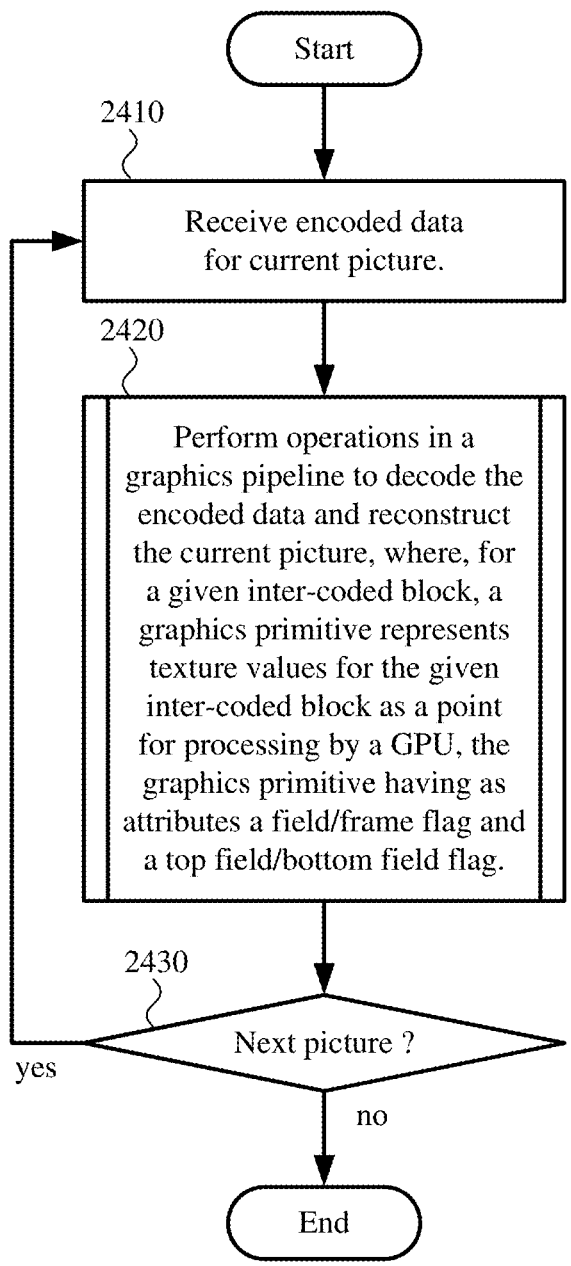
FIG. 24 is a flowchart illustrating a generalized technique for video decoding and rendering in a graphics pipeline, in which a graphics primitive has attributes to handle interlaced video content.

FIG. 24 shows a generalized technique (2400) for video decoding and rendering in a graphics pipeline, in which a graphics primitive represents texture values for a given inter-coded block as a point for processing by a GPU, and the graphics primitive has attributes to handle interlaced video content. The technique (2400) is performed by a video playback tool that includes a video decoder system, such as the video decoder system (400) described with reference to FIG. 4. The video decoder system can include one or more decoding routines executable in a browser environment running on a CPU, as well as one or more shader routines executable by a GPU. The decoding routine(s) executable in the browser environment and shader routine(s) executable by the GPU can be downloaded to the browser environment from a server, then executed locally.

The video playback tool receives (2410) encoded data for a current picture. The current picture is an interlaced video frame having a top field and a bottom field. The video playback tool can store the encoded data in a buffer (e.g., a coded data buffer, in CPU memory, configured to store the encoded data).

The video playback tool performs (2420) operations to decode the encoded data and reconstruct the current picture. For example, the video playback tool includes a video decoder system configured to perform the operations. In performing the operations, for a given inter-coded block of multiple inter-coded blocks of the current picture, a graphics primitive represents texture values for the given block as a point for processing by a GPU. The graphics primitive is, for example, a point sprite. The graphics primitive has various attributes including (a) a flag indicating whether the given block is field-coded or frame-coded, and (b) a flag indicating whether the given block, if field-coded, is associated with the top field or the bottom field. The attributes of the graphics primitive can also include: (c) an MV attribute, (d) a block size attribute, (e) a display index value attribute, and/or (f) a residual index value attribute or residual values for the block, as described with reference to FIG. 11. As part of the decoding, the video playback tool can use the graphics primitives when performing motion compensation or other operations.

The video playback tool checks (2430) whether to continue with decoding for the next picture and, if so, receives (2410) encoded data for the next picture. For the sake of simplicity, FIG. 24 does not show other aspects of decoding.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system that implements a video playback tool comprising:
   a buffer configured to store encoded data for a current picture; and
   a video decoder system configured to perform operations to decode the encoded data and reconstruct the current picture, wherein, for a given inter-coded block among multiple inter-coded blocks of the current picture, a graphics primitive represents texture values for the given inter-coded block as a point for processing by a graphics processing unit ("GPU"), and wherein the operations include:
    storing, in a reference buffer in GPU memory, sample values of a reference picture; and
    determining predicted sample values for the multiple inter-coded blocks, including performing interpolation to determine interpolated sample values at fractional-sample offsets, wherein at least some of the interpolation uses a filter having multiple taps.

2. The computer system of claim 1, wherein the graphics primitive is a point sprite.

3. The computer system of claim 1, wherein the graphics primitive for the given inter-coded block has multiple attributes, the multiple attributes including one or more of:
    a motion vector attribute that indicates location of predicted sample values for the given inter-coded block in a reference buffer in GPU memory;
    a block size attribute for the given inter-coded block;
    a display index value attribute that indicates location of the given inter-coded block in a display buffer; and
    a residual index value attribute or residual values for the given inter-coded block, the residual index value attribute indicating location of the residual values in a texture buffer in GPU memory.

4. The computer system of claim 3, wherein the current picture is an interlaced frame having a top field and a bottom field, and wherein the multiple attributes of the graphics primitive for the given inter-coded block further include one or more of:
    a flag indicating whether the given inter-coded block is field-coded or frame-coded; and
    a flag indicating whether the given inter-coded block, if field-coded, is associated with the top field or the bottom field.

5. The computer system of claim 1, wherein the current picture is a field of an interlaced video frame, and wherein the reference picture is a field of an interlaced video frame.

6. The computer system of claim 1, wherein the operations further include:
    representing multiple partitions of the current picture as the multiple inter-coded blocks, the multiple inter-coded blocks including multiple sets of inter-coded blocks associated with different block sizes;
    wherein the determining predicted sample values is performed in multiple passes, each of the multiple passes being performed for a different one of the multiple sets of inter-coded blocks.

7. The computer system of claim 6, wherein each of the different block sizes is square, and wherein the representing includes, for each of the multiple partitions of the current picture:
    if partition size of the partition is square, using one of the multiple inter-coded blocks to represent the partition; and
    otherwise, using two or more of the multiple inter-coded blocks to represent the partition.

8. The computer system of claim 1, wherein the operations further include, with a vertex shader routine executable by the GPU, one or more of:
    in parallel for the multiple inter-coded blocks, respectively, resolving motion vectors into locations, in the reference buffer in GPU memory, of the predicted sample values;
    in parallel for the multiple inter-coded blocks, respectively, determining locations, in a texture buffer in GPU memory, of residual values; and
    in parallel for the multiple inter-coded blocks, respectively, determining locations in a display buffer.

9. The computer system of claim 1, wherein the operations further include, with a fragment shader routine executable by the GPU, one or more of:
    in parallel for the multiple inter-coded blocks, respectively, using motion compensation to perform the determining the predicted sample values;
    in parallel for the multiple inter-coded blocks, respectively, combining the predicted sample values and corresponding residual values, thereby reconstructing sample values;
    in parallel for the multiple inter-coded blocks, respectively, selectively filtering boundaries;
    in parallel for the multiple inter-coded blocks, respectively, transferring the sample values to a display buffer;
    in parallel for the multiple inter-coded blocks, respectively, performing chroma upsampling; and
    in parallel for the multiple inter-coded blocks, respectively, performing color space conversion.

10. The computer system of claim 1, wherein the reference buffer is a first reference buffer, wherein the sample values of the reference picture in the first reference buffer are sample values at integer-sample offsets, and wherein the determining predicted sample values includes:
    for at least part of the current picture:
        interpolating first interpolated sample values at half-sample offsets horizontally between at least some of the sample values at integer-sample offsets;
        storing, in a second reference buffer in GPU memory, the first interpolated sample values;
        interpolating second interpolated sample values at half-sample offsets vertically between at least some of the sample values at integer-sample offsets; and
        storing, in a third reference buffer in GPU memory, the second interpolated sample values; and
    for each of the multiple inter-coded blocks, if appropriate, interpolating third interpolated sample values at quarter-sample offsets using selected sample values among the sample values at integer-sample offsets, the first interpolated sample values, and the second interpolated sample values.

11. The computer system of claim 10, wherein the interpolating the first interpolated sample values and the calculating the second interpolated sample values use the filter having multiple taps, and wherein the interpolating the third interpolated sample values uses bilinear filtering.

12. The computer system of claim 1, wherein the given inter-coded block is a part of a macroblock or part of a coding unit.

13. The computer system of claim 1, wherein the texture values are sample values for the multiple inter-coded blocks in GPU memory in a planar color component format, and wherein the operations further include:
    with one or more shader routines, transferring, in parallel, the sample values of the multiple inter-coded blocks, respectively, to a display buffer, wherein the sample values in the display buffer are in a packed color component format.

14. The computer system of claim 1, wherein the video decoder system includes:
    one or more decoding routines executable in a browser environment running on a central processing unit; and
    the one or more shader routines executable by the GPU.

15. One or more computer-readable media storing computer-executable instructions for causing a computer system, when programmed thereby, to perform:
    receiving encoded data for a current picture; and
    performing operations to decode the encoded data and reconstruct the current picture, wherein, for a given inter-coded block among multiple inter-coded blocks of the current picture, a graphics primitive represents texture values for the given inter-coded block as a point for processing by a graphics processing unit ("GPU"), and wherein the operations include:
        representing multiple partitions of the current picture as the multiple inter-coded blocks, the multiple inter-coded blocks including multiple sets of inter-coded blocks associated with different block sizes; and
        performing motion compensation for the multiple inter-coded blocks in multiple passes, each of the multiple passes being performed for a different one of the multiple sets of inter-coded blocks.

16. The one or more computer-readable media of claim 15, wherein each of the different block sizes is a square size, and wherein the representing includes, for each of the multiple partitions of the current picture:
    if partition size of the partition is square, using one of the multiple inter-coded blocks to represent the partition; and
    otherwise, using two or more of the multiple inter-coded blocks to represent the partition.

17. The one or more computer-readable media of claim 15, wherein the operations further comprise:
    storing, in a reference buffer in GPU memory, sample values of a reference picture; and
    performing interpolation to determine interpolated sample values at fractional-sample offsets, wherein at least some of the interpolation uses a filter having multiple taps.

18. In a computing device that includes a graphics processing unit ("GPU"), a method comprising:
    receiving encoded data for a current picture, wherein the current picture is an interlaced video frame having a top field and a bottom field; and
    performing operations to decode the encoded data and reconstruct the current picture, wherein, for a given inter-coded block among multiple inter-coded blocks of the current picture, a graphics primitive represents texture values for the given inter-coded block as a point for processing by the GPU, and wherein the graphics primitive for the given inter-coded block has multiple attributes, the multiple attributes including:
        a flag indicating whether the given inter-coded block is field-coded or frame-coded; and
        a flag indicating whether the given inter-coded block, if field-coded, is associated with the top field or the bottom field.

19. The method of claim 18, wherein the multiple attributes of the graphics primitive for the given inter-coded block further include one or more of:
    a motion vector attribute that indicates location of predicted sample values for the given inter-coded block in a reference buffer in GPU memory;
    a block size attribute for the given inter-coded block;
    a display index value attribute that indicates location of the given inter-coded block in a display buffer; and
    a residual index value attribute or residual values for the given inter-coded block, the residual index value attribute indicating location of the residual values in a texture buffer in GPU memory.

20. The method of claim 18, wherein the operations include:
    storing, in a reference buffer in GPU memory, sample values for a reference picture, wherein lines of sample values for a top field of the reference picture are separated from lines of sample values for a bottom field of the reference picture in the reference buffer; and
    performing motion compensation for the multiple inter-coded blocks.

\* \* \* \* \*